(12) United States Patent
Ly et al.

(10) Patent No.: US 10,575,153 B2
(45) Date of Patent: Feb. 25, 2020

(54) ENHANCED OPERATIONS BETWEEN SERVICE LAYER AND MANAGEMENT LAYER IN AN M2M SYSTEM BY ALLOWING THE EXECUTION OF A PLURALITY OF COMMANDS ON A PLURALITY OF DEVICES

(71) Applicant: Convida Wireless, LLC, Wilmington, DE (US)

(72) Inventors: Quang Ly, North Wales, PA (US); Chonggang Wang, Princeton, NJ (US); Guang Lu, Thornhill (CA); Lijun Dong, San Diego, CA (US); Xu Li, Plainsboro, NJ (US); Zhuo Chen, Claymont, DE (US); Shamim Akbar Rahman, Cote St. Luc (CA)

(73) Assignee: Convida Wireless LLC, Wilmington, DE (US)

( * ) Notice: Subject to any disclaimer, the term of this patent is extended or adjusted under 35 U.S.C. 154(b) by 334 days.

(21) Appl. No.: 15/326,774

(22) PCT Filed: Jul. 17, 2015

(86) PCT No.: PCT/US2015/040942
§ 371 (c)(1),
(2) Date: Jan. 17, 2017

(87) PCT Pub. No.: WO2016/011373
PCT Pub. Date: Jan. 21, 2016

(65) Prior Publication Data
US 2017/0223479 A1 Aug. 3, 2017

Related U.S. Application Data

(60) Provisional application No. 62/026,165, filed on Jul. 18, 2014.

(51) Int. Cl.
*H04W 4/50* (2018.01)
*H04W 4/70* (2018.01)
(Continued)

(52) U.S. Cl.
CPC ........... *H04W 4/50* (2018.02); *G06F 9/54* (2013.01); *H04L 41/0893* (2013.01);
(Continued)

(58) Field of Classification Search
None
See application file for complete search history.

(56) References Cited

U.S. PATENT DOCUMENTS 6,968,553 B1 * 11/2005 Theeten ............... H04L 29/06
709/223
2009/0077215 A1 * 3/2009 Jayanthi ............... G06F 15/177
709/223
(Continued)

FOREIGN PATENT DOCUMENTS

EP         2523528 A1    11/2012
JP     2014-506764 A     3/2014
(Continued)

OTHER PUBLICATIONS

Asma Elmangoush, Design of RESTful APIs for M2M Services, pp. 50-56 (Year: 2012).*
(Continued)

*Primary Examiner* — Joshua Joo
(74) *Attorney, Agent, or Firm* — BakerHostetler

(57) ABSTRACT

The present application is directed to a computer-implemented device and method for performing group-on-group operations over the M2M interface. The device and method includes the step of receiving a request to initiate the group-on-group operation from a device owner including commands of a group resource defined in a uniform resource
(Continued)

indicator. The device and method includes the step of processing the request and also a step for sending a group management request API to a management server to execute the commands on the devices. Further, there is a step of receiving a response from the management server indicating execution status of the commands by the device. The application also is directed to a computer-implemented method for establishing group-on-group operation over the M2M interface.

18 Claims, 18 Drawing Sheets

(51) Int. Cl.
G06F 9/54 (2006.01)
H04L 12/24 (2006.01)
H04L 29/08 (2006.01)

(52) U.S. Cl.
CPC .............. *H04L 67/125* (2013.01); *H04W 4/70* (2018.02); *H04L 41/0246* (2013.01); *H04L 41/0803* (2013.01)

(56) References Cited

U.S. PATENT DOCUMENTS

| | | | | |
|---|---|---|---|---|
| 2011/0268047 | A1* | 11/2011 | Nath | H04W 4/08 370/329 |
| 2012/0151100 | A1* | 6/2012 | Roche | G06F 13/10 710/16 |
| 2014/0126581 | A1 | 5/2014 | Wang et al. | |
| 2014/0181203 | A1* | 6/2014 | Hegarty | H04L 65/1016 709/204 |
| 2014/0242940 | A1* | 8/2014 | Koo | H04L 67/125 455/406 |
| 2014/0244838 | A1* | 8/2014 | Ryu | H04L 43/04 709/224 |
| 2014/0369251 | A1* | 12/2014 | Zhang | H04W 4/08 370/312 |
| 2015/0006744 | A1* | 1/2015 | Chatterjee | H04L 65/1073 709/228 |
| 2015/0280987 | A1* | 10/2015 | Yasuda | H04L 41/145 709/220 |
| 2016/0029190 | A1* | 1/2016 | Rattner | H04W 76/10 455/414.4 |
| 2017/0238279 | A1* | 8/2017 | Jeong | H04W 4/08 455/458 |

FOREIGN PATENT DOCUMENTS

| | | | | |
|---|---|---|---|---|
| WO | WO-2012109531 | A2 * | 8/2012 | ............. H04W 4/70 |
| WO | WO-2012118711 | A2 * | 9/2012 | ............. H04W 4/70 |
| WO | WO-2013106188 | A2 * | 7/2013 | ............. H04W 60/00 |

OTHER PUBLICATIONS

OneM2M-TS0001 V-0.8.0, Functional Architecture Baseline Draft, Jun. 30, 2014, 338 pages.
Congdon, H., "Smart Device Communications; Protocol Aspects; Introduction", TIA-4940.020, Feb. 2013, 9 pages.
ETSI TS 102 690 V2.1.1 Technical Specification, Machine-to-Machine Communications (M2M); Functional Architecture, Oct. 2013, 332 pages.
International Patent Application No. PCT/US2015/040942: International Search Report and the Written Opinion dated Oct. 15, 2015, 21 pages.
OneM2M "Device Management Using MgmtCmd Resource" WG2/WG5, Dec. 1, 2013, 12 pages.
OneM2M "Management Enablement (BBF)", TS-0006 Management_Enablement_(BBF) V0.1.0, Mar. 12, 2014, 17 pages.
OneM2M "oneM2M Functional Architecture Baseline Draft" TS-0001 V-0.9.0, Technical Specification, Jul. 17, 2014, 315 pages.
OneM2M "Management Enablement (OMA)", TS-0005 V-0.2.0, Technical Specification, Jun. 16, 2014, 20 pages.
Open Mobile Alliance (OMA) "Gateway Management Object Technical Specification", Version 1.1, Jun. 17, 2014, 89 pages.
Open Mobile Alliance (OMA) "Lightweight Machine to Machine Technical Specification", Candidate Version 1.0, Dec. 10, 2013, 104 pages.
Open Mobile Alliance (OMA) "Management Interface for M2M Rquirements", Version 1.0, Nov. 25, 2014, 14 pages.
Open Mobile Alliance (OMA) "OMA Device Mangamenet Representation Protocol", Version 1.3, Apr. 22, 2013, 80 pages.
Open Mobile Alliance (OMA) "OMA Device Mangement Standardized Objects", Version 1.3, Oct. 9, 2012, 31 pages.
Tr-069 "CPE WAN Management Protocol", Amendment 5, CWMP Version: 1.4, Broadband Forum, Technical Report, Nov. 2013, 228 pages.
Yin, Jiaxin, "Group Management Procedure", OneM2M, Mar. 28, 2014, 9 pages.
OneM2M Input Contribution Doc# PRO-2014-0154R02_mgmtCmd, PRO#10.0, InterDigital, "Stage 3 text for <mgmtCmd>", Apr. 7, 2014, 17 pages.

* cited by examiner

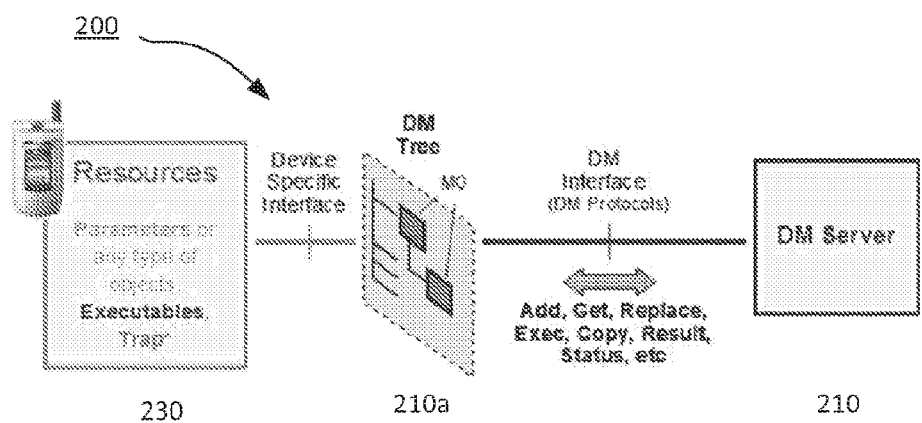
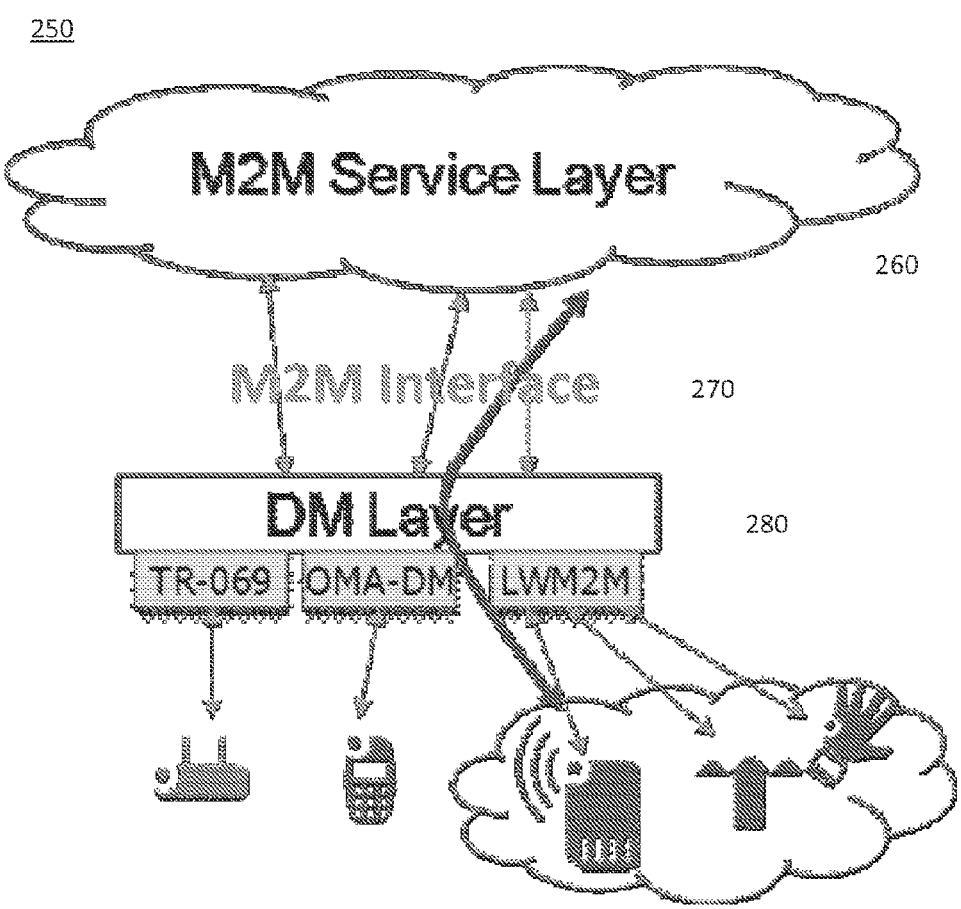
FIGs. 2A-B

ENHANCED OPERATIONS BETWEEN SERVICE LAYER AND MANAGEMENT LAYER IN AN M2M SYSTEM BY ALLOWING THE EXECUTION OF A PLURALITY OF COMMANDS ON A PLURALITY OF DEVICES

CROSS-REFERENCE TO RELATED APPLICATIONS

This application is a National Stage Application filed under 35 U.S.C. 371 of International Application No. PCT/US2015/040942 filed Jul. 17, 2015, which claims priority to U.S. Provisional Patent Application No. 62/026,165, filed Jul. 18, 2014, the disclosure of which is incorporated herein by reference in its entirety.

BACKGROUND

Device Management (DM) has traditionally been performed between a management server and a management client running on a device. This mode of operation may suit existing DM protocols for devices such as personalized mobile devices, e.g., phones and tablets, or operational network devices that are individually managed. As such, there has been limited development and support in managing DM protocols for a group of devices.

The Open Mobile Alliance (OMA) has developed a number of protocols for DM in a network, including the OMA DM protocol, the OMA Gateway Managed Object (GwMO) protocol and the OMA Lightweight Machine-to-Machine (LWM2M) protocol. Moreover, the Broadband Forum (BBF) includes Customer Premised Equipment (CPE) WAN Management Protocol (CWMP). These protocols may be used to manage standalone devices, such as mobile devices, in a network. The OMA GwMO protocol may be used for managing a group of end devices behind a gateway. However, the protocol is limited to devices attached to the gateway. The OMA LWM2M may be used for managing constrained machine-to-machine (M2M) or Internet-of-Things (IoT) devices. The BBF CWMP protocol specifies a mechanism to use multicast groups within a Local Area Network (LAN) to provide file transfers to a group of devices. Moreover, these protocols primarily focus on software downloads. Separately, the BBF CWMP is limited to devices in the LAN where multicast can be deployed. In sum, there is a deficiency in providing enhanced group management operations in an end to end architecture by the current DM standards.

Specifically, in the current standards, there is also little or no procedures on how a M2M Server can communicate with a DM Server. This is attributed to the non-standardization of the interfaces for communication. Presently, interfaces require customized developments for each service provider. For example, in order for a service layer to support OMA DM, OMA Lightweight M2M (LWM2M), and BBF CWMP devices, three custom API interfaces need to be developed to communicate with each of these devices. This reduces efficiency and also limits interoperability between different systems.

SUMMARY

This summary is provided to introduce a selection of concepts in a simplified form that are further described below in the Detailed Description. This Summary is not intended to limit the scope of the claimed subject matter. The foregoing needs are met, to a great extent, by the present application directed to a process and system for enhancing Device Management operations for group operations to a Management Server.

One aspect of the application is directed to an apparatus for performing group-on-group operations comprising a non-volatile memory and a processor. The non-volatile memory stores computer-executable instructions that, when executed by a processor, causes the server to perform certain steps. One step is for receiving a request to initiate the group-on-group operations from a device owner including commands of a group resource defined in a uniform resource indicator. Next, the request is processed. Further, there is a step of sending a group management request API to a DM server to establish a session with a DM client running on a device to execute the commands.

Another aspect of the application is directed to a computer-implemented method for establishing group-on-group operations over the M2M interface which exists between a M2M Server and a Management Server. The method includes a step of receiving a registration request from a device owner to manage a group of devices. The method also includes a step of receiving registration notification for the group of devices. Next, a request is received to create a device group, such as for example, from a device owner. Further, the received request to create the device group is executed. In one embodiment, the method further includes the steps of receiving a request to create a command group and processing the received request to create the command group. According to another embodiment, the method further includes the steps of sending a group management request API to a DM server to create the device group. In another embodiment, the method further includes the step of sending group management request API to a DM server to create the command group.

Yet another aspect of the application is directed to a computer-implemented method for performing group-on-group operations over the M2M interface. The method includes the step of receiving a request to initiate the group-on-group operations from a device owner including commands of a group resource defined in a uniform resource indicator. The method includes the step of processing the request. In addition there is a step of sending a group management request API to a DM server to establish a session with a DM client running on a device to execute the commands. Further, there is a step of receiving a response from the DM server indicating successful execution of the commands by the device.

There has thus been outlined, rather broadly, certain embodiments of the invention in order that the detailed description thereof may be better understood, and in order that the present contribution to the art may be better appreciated.

BRIEF DESCRIPTION OF THE DRAWINGS

In order to facilitate a more robust understanding of the application, reference is now made to the accompanying drawings, in which like elements are referenced with like numerals. These drawings should not be construed to limit the application and are intended only to be illustrative.

FIG. 2A illustrates the OMA DM Protocol architecture in which a DM Server sends Device Management commands to DM Clients running on devices according to an embodiment of the application.

FIG. 2B illustrates a M2M interface with communication between a Service Layer and a Device Management Layer according to an embodiment of the application.

DETAILED DESCRIPTION OF THE ILLUSTRATIVE EMBODIMENTS

Figure 1A:
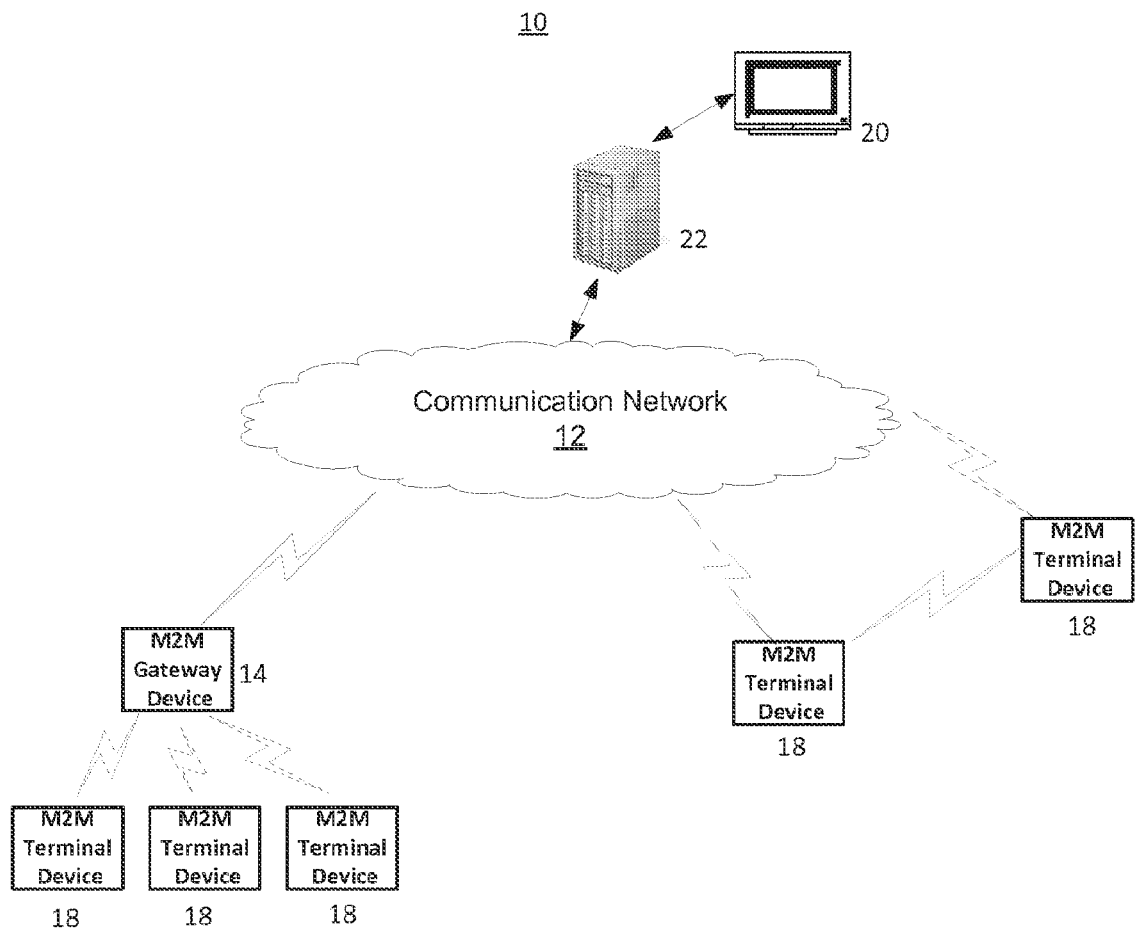
FIG. 1A illustrates a system diagram of an example machine-to-machine (M2M), Internet of Things (IoT), or Web of Things (WoT) communication system in which one or more disclosed embodiments may be implemented according to the present application.

A detailed description of the illustrative embodiments will be discussed in reference to various figures, embodiments and aspects herein. Although this description provides detailed examples of possible implementations, it should be understood that the details are intended to be examples and thus do not limit the scope of the application.

Reference in this specification to "one embodiment," "an embodiment," "one or more embodiments," "an aspect" or the like means that a particular feature, structure, or characteristic described in connection with the embodiment is included in at least one embodiment of the disclosure. Moreover, the term "embodiment" in various places in the specification is not necessarily referring to the same embodiment. That is, various features are described which may be exhibited by some embodiments and not by the other.

In a M2M/IoT realm, the capability of performing bulk device management operations can be an integral feature for an M2M Server. Accordingly, this application is directed to enhancements to existing service layer and management layer architectures to support enhanced group management operations in an end-to-end system. Namely, M2M applications can supply a set of management commands in the application/service layer to more efficiently manage a group of devices.

According to one aspect of the application, enhanced group management procedures in service layer and management layer architectures are proposed to allow for managing device and command groups. According to another aspect of the application, a mechanism to perform group-on-group operations in which a set of commands can be applied to a group of devices is described. This capability will allow for more efficient management of devices in M2M and IoT systems. According to another aspect, new message formats for group management procedures to communicate over the M2M Interface are described. The new message formats can be used in the standardization of the interface between a service layer and the management layer. This will offer interoperability between different device management protocols with a service layer.

According to yet another aspect of the application, new resource and attribute embodiments are defined in oneM2M, OMA DM, OMA LWM2M, and BBF CWMP architectures to support enhanced group management operations. For example, new oneM2M <group> resource attributes are introduced to allow M2M applications to create groups of commands and provide arguments for those commands. Moreover, new oneM2M <group> addressing schemes for specifying group-on-group operations are described. In addition, enhancements to the <mgmtCmd> resource attribute execTarget are described to allow for specifying group operations. Further, new group resources for OMA DM, OMA LWM2M, and BBF CWMP protocols to support group operations are described. Even further, a specification of group processing procedures within OMA DM, OMA LWM2M, and BBF CWMP protocols to support group operations are described.

The following acronyms will be commonly used in the instant application and are therefore provided below in Table 1 for reference:

TABLE 1

| ACRONYM | DESCRIPTION |
| --- | --- |
| API | Application Programming Interface |
| ASN | Application Service Node |
| CPE | Customer Premise Equipment |
| CRUD | Create, Retrieve, Update, Delete |
| CSE | Common Service Entity |
| CWMP | CPE WAN Management Protocol |
| DM | Device Management |
| FQDN | Fully Qualified Domain Name |
| GwMO | Gateway Managed Object |
| IoT | Internet of Things |
| LAN | Local Area Network |
| LWM2M | Lightweight M2M |
| M2M | Machine-to-Machine |

TABLE 1-continued

| ACRONYM | DESCRIPTION |
| --- | --- |
| ML | Management Layer |
| MO | Managed Object |
| MS | Management Server |
| MSISDN | Mobile Subscriber ISDN Number |
| OMA | Open Mobile Alliance |
| REST | Representational State Transfer |
| RPC | Remote Procedure Call |
| SCOMO | Software Component Management Object |
| SL | Service Layer |
| URI | Uniform Resource Identifier |
| URL | Uniform Resource Locator |
| WAN | Wide Area Network |
| WG | Working Group |

This application is intended to cover platform functionality and support for both application enablement platforms (AEPs) and connected device platforms (CDPs). AEPs include an application enablement layer and a service layer including the World Wide Web and Internet. The application enablement layer includes but is not limited to the following: (i) servicing APIs, rules/scripting engine; (ii) SDK programming interface; and (iii) enterprise systems integration. The application enablement layer may also include value-added services including but not limited to discovery, analytics, context and events. The service layer including the world wide web and Internet may comprise, for example, analytics, billing, raw APIs, web service interfaces, semantic data models, device/service discovery, device management, security, data collection, data adaptation, aggregation, event management, context management, optimized connectivity and transport, M2M gateway, and addressing and identification. The CDPs may include connectivity analysis, usage analysis/reporting/alerts, policy control, automated provisioning, SIM activation/deactivation, and subscription Activation/Deactivation.

General Architecture

FIG. 1A is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, gateway or service platform may be a component of the IoT/WoT as well as an IoT/WoT service layer, etc.

As shown in FIG. 1A, the M2M/IoT/WoT communication system 10 includes a communication network 12. The communication network 12 may be a fixed network, e.g., Ethernet, Fiber, ISDN, PLC, or the like or a wireless network, e.g., WLAN, cellular, or the like, or a network of heterogeneous networks. The network may include the above-noted CAINE network. For example, the communication network 12 may comprise of multiple access networks that provides content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 1A, the M2M/IoT/WoT communication system 10 may include the Infrastructure Domain and the Field Domain. The Infrastructure Domain refers to the network side of the end-to-end M2M deployment, and the Field Domain refers to the area networks, usually behind a M2M gateway. The Field Domain includes M2M gateways 14, such as Content Routers (CRs), and terminal devices 18, such Content clients. It will be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals via the communication network 12 or direct radio link. The M2M gateway device 14 allows wireless M2M devices, e.g., cellular and non-cellular as well as fixed network M2M devices, e.g., PLC, to communicate either through operator networks, such as the communication network 12 or direct radio link. For example, the M2M devices 18 may collect data and send the data, via the communication network 12 or direct radio link, to a M2M application 20 or M2M devices 18. The M2M devices 18 may also receive data from the M2M application 20 or a M2M device 18. Further, data and signals may be sent to and received from the M2M application 20 via an M2M service layer 22, as described below. M2M devices 18 and gateways 14 may communicate via various networks including, cellular, WLAN, WPAN, e.g., Zigbee, 6LoWPAN, Bluetooth, direct radio link, and wireline for example.

Figure 1B:
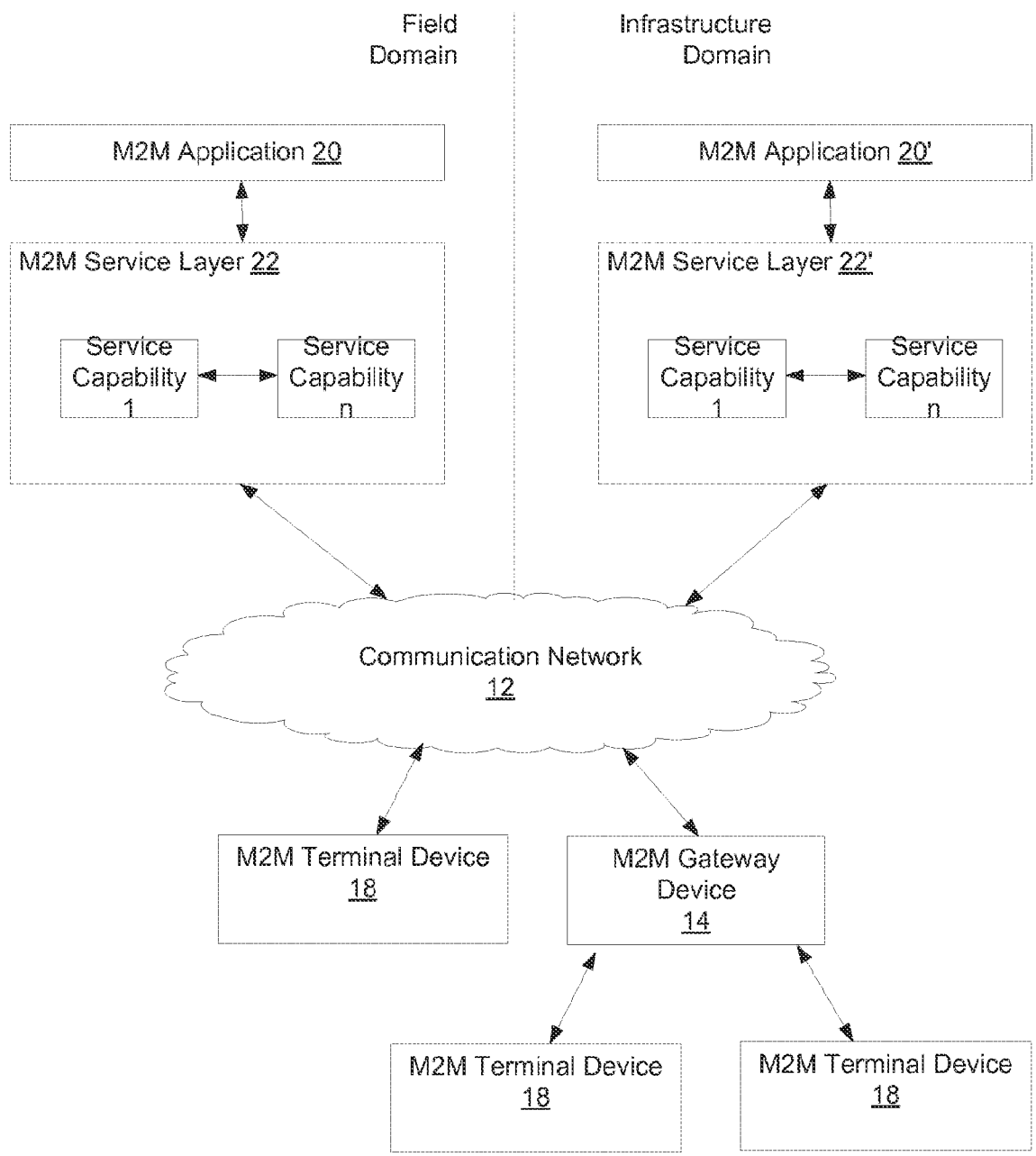
FIG. 1B illustrates a system diagram of an example architecture that may be used within the M2M/IoT/WoT communications system illustrated in FIG. 1A according to the present application.

Referring to FIG. 1B, the illustrated M2M service layer 22 in the field domain provides services for the M2M application 20, M2M gateway devices 14, and M2M terminal devices 18 and the communication network 12. It will be understood that the M2M service layer 22 may communicate with any number of M2M applications, M2M gateway devices 14, M2M terminal devices 18 and communication networks 12 as desired. The M2M service layer 22 may be implemented by one or more servers such as the one or more Content servers in this application, computers, or the like. The M2M service layer 22 provides service capabilities that apply to M2M terminal devices 18, M2M gateway devices 14 and M2M applications 20. These may include routers. The functions of the M2M service layer 22 may be implemented in a variety of ways. For example, the M2M service layer 22 could be implemented in a web server, in the cellular core network, in the cloud, etc.

Similar to the illustrated M2M service layer 22, there is the M2M service layer 22' in the Infrastructure Domain. M2M service layer 22' provides services for the M2M application 20' and the underlying communication network 12' in the infrastructure domain. M2M service layer 22' also provides services for the M2M gateway devices 14 and M2M terminal devices 18 in the field domain. It will be understood that the M2M service layer 22' may communicate with any number of M2M applications, M2M gateway devices and M2M terminal devices. The M2M service layer 22' may interact with a service layer by a different service provider. The M2M service layer 22' may be implemented by one or more servers such as a content server, computers, virtual machines, e.g., cloud/compute/storage farms, etc., or the like.

Referring also to FIG. 1B, the M2M service layer 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layer 22 and 22' also enables M2M applications 20 and 20' to communicate through various networks 12 and 12' in connection with the services that the service layer 22 and 22' provide.

The M2M applications 20 and 20' may include applications in various industries such as, without limitation, transportation, health and wellness, connected home, energy management, asset tracking, and security and surveillance. As mentioned above, the M2M service layer, running across the devices, gateways, and other servers of the system, supports functions such as, for example, data collection, device management, security, billing, location tracking/geofencing, device/service discovery, and legacy systems integration, and provides these functions as services to the M2M applications 20 and 20'. Moreover, the M2M service layer may also be configured to interface with other devices such as Content servers, Content routers and Content clients as discussed in this application and illustrated in the figures.

The method of updating context information related to published content on a Content router as well as determining the best next-hop router for resolving a content request as discussed in the present application may be implemented as part of a service layer. The service layer is a software middleware layer that supports value-added service capabilities through a set of Application Programming Interfaces (APIs) and underlying networking interfaces. Both ETSI M2M and oneM2M use a service layer that may contain this method of reserving a Track. ETSI M2M's service layer is referred to as the Service Capability Layer (SCL). The SCL may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs), e.g., service capabilities. An instantiation of a set of one or more particular types of CSFs is referred to as a Common Services Entity (CSE) which can be hosted on different types of network nodes, e.g., infrastructure node, middle node, application-specific node. Further, the method of reserving a Track as described in the present application can be implemented as part of an M2M network that uses a Service Oriented Architecture (SOA) and/or a resource-oriented architecture (ROA) to access services such as the reserving a track according to the present application.

Figure 1C:
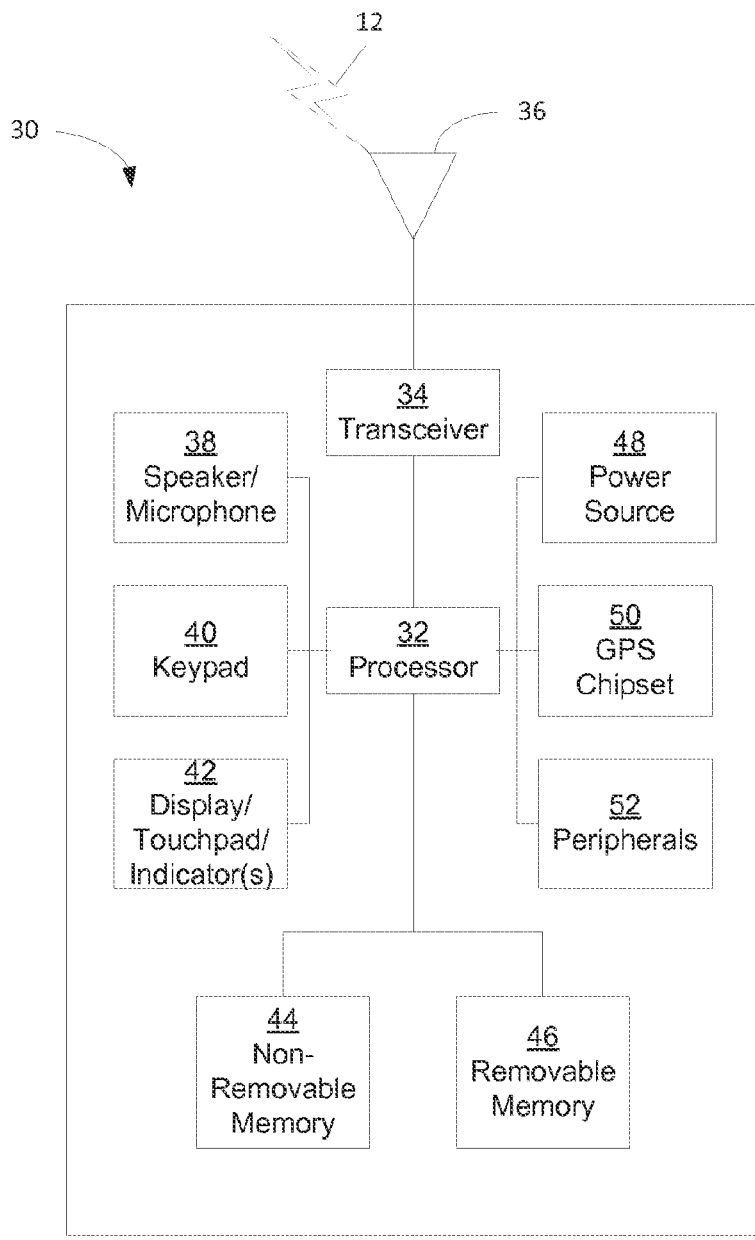
FIG. 1C illustrates a system diagram of an example M2M/IoT/WoT terminal or gateway device that may be used within the communications system illustrated in FIG. 1A according to the present application.

FIG. 1C is a system diagram of an example M2M device 30, such as an M2M terminal device 18 or an M2M gateway device 14 for example. As shown in FIG. 1C, the M2M device 30 may include a processor 32, a transceiver 34, a transmit/receive element 36, a speaker/microphone 38, a keypad 40, a display/touchpad/indicator(s) 42, non-removable memory 44, removable memory 46, a power source 48, a global positioning system (GPS) chipset 50, and other peripherals 52. For example, the processor for a content router may include a Content Publication Manager (CPM), Bloom filter processor, and/or a Content Resolution Manager (CRM) as will be discussed in more detail below and illustrated in the accompanying drawings. The M2M terminal device 18 may be a Content client and the M2M gateway device 14 may be a Content router or Content server according to the description of the application. It will be appreciated that the M2M device 40 may include any sub-combination of the foregoing elements while remaining consistent with an embodiment. This device may be a device that uses the disclosed systems and methods for embedded semantics naming of sensory data. The M2M device 30 may also be employed with other devices as described in this application and as illustrated in the figures.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 32 may perform signal coding, data processing, power control, input/output processing, and/or any other functionality that enables the M2M device 30 to operate in a wireless environment. The processor 32 may be coupled to the transceiver 34, which may be coupled to the transmit/receive element 36. While FIG. 1C depicts the processor 32 and the transceiver 34 as separate components, it will be appreciated that the processor 32 and the transceiver 34 may be integrated together in an electronic package or chip. The processor 32 may perform application-layer programs, e.g., browsers, and/or radio access-layer (RAN) programs and/or communications. The processor 32 may perform security operations such as authentication, security key agreement, and/or cryptographic operations, such as at the access-layer and/or application layer for example.

The transmit/receive element 36 may be configured to transmit signals to, or receive signals from, an M2M service platform 22. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 1C as a single element, the M2M device 30 may include any number of transmit/receive elements 36. More specifically, the M2M device 30 may employ MIMO technology. Thus, in an embodiment, the M2M device 30 may include two or more transmit/receive elements 36, e.g., multiple antennas, for transmitting and receiving wireless signals.

The transceiver 34 may be configured to modulate the signals that are to be transmitted by the transmit/receive element 36 and to demodulate the signals that are received by the transmit/receive element 36. As noted above, the M2M device 30 may have multi-mode capabilities. Thus, the transceiver 34 may include multiple transceivers for enabling the M2M device 30 to communicate via multiple RATs, such as UTRA and IEEE 802.11, for example.

The processor 32 may access information from, and store data in, any type of suitable non-transitory memory, such as the non-removable memory 44 and/or the removable memory 46. The non-removable memory 44 may include random-access memory (RAM), read-only memory (ROM), a hard disk, or any other type of memory storage device. According to this application, the memory may include a Content Record Table (CRT) and/or a Content Forwarding Table (CFT) as will be discussed in more detail below and illustrated in the accompanying drawings. The removable memory 46 may include a subscriber identity module (SIM) card, a memory stick, a secure digital (SD) memory card, and the like. In other embodiments, the processor 32 may access information from, and store data in, memory that is not physically located on the M2M device 30, such as on a server or a home computer.

The processor 32 may receive power from the power source 48, and may be configured to distribute and/or control the power to the other components in the M2M device 30. The power source 48 may be any suitable device for powering the M2M device 30. For example, the power source 48 may include one or more dry cell batteries, e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information, e.g., longitude and latitude, regarding the current location of the M2M device 30. It will be appreciated that the M2M device 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include an accelerometer, an e-compass, a satellite transceiver, a sensor, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1D:
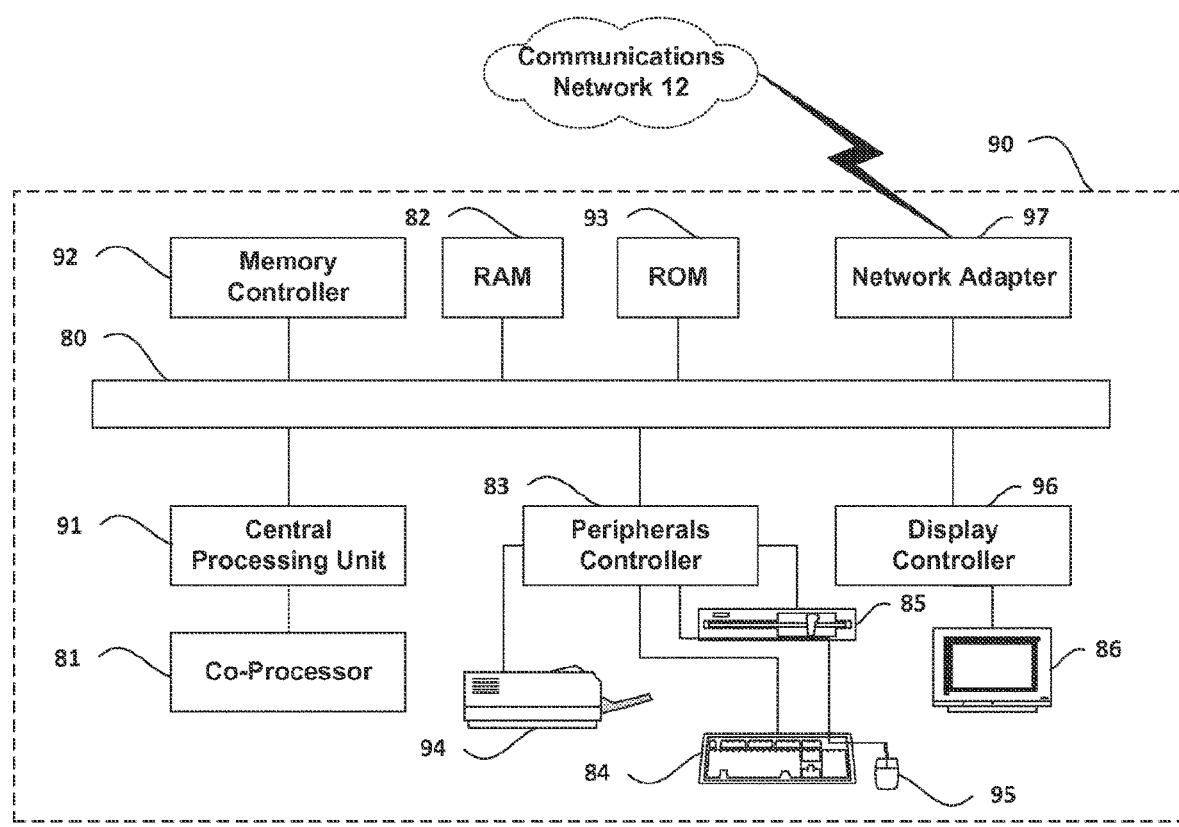
FIG. 1D is a block diagram of an example computing system in which aspects of the communication system of FIG. 1A and the context-aware content publication and resolution concepts described herein may be embodied according to the present application.

FIG. 1D is a block diagram of an exemplary computing system 90 on which, for example, the M2M service platform 22 of FIG. 1A and FIG. 1B may be implemented. Computing system 90 may comprise a computer or server and may be controlled primarily by computer readable instructions, which may be in the form of software, wherever, or by whatever means such software is stored or accessed. Such computer readable instructions may be executed within central processing unit (CPU) 91 to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91 that performs additional functions or assists CPU 91. CPU 91 and/or coprocessor 81 may receive, generate, and process data related to the disclosed systems and methods for embedded semantic naming, such as queries for sensory data with embedded semantic names.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memory devices coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Figure 15:
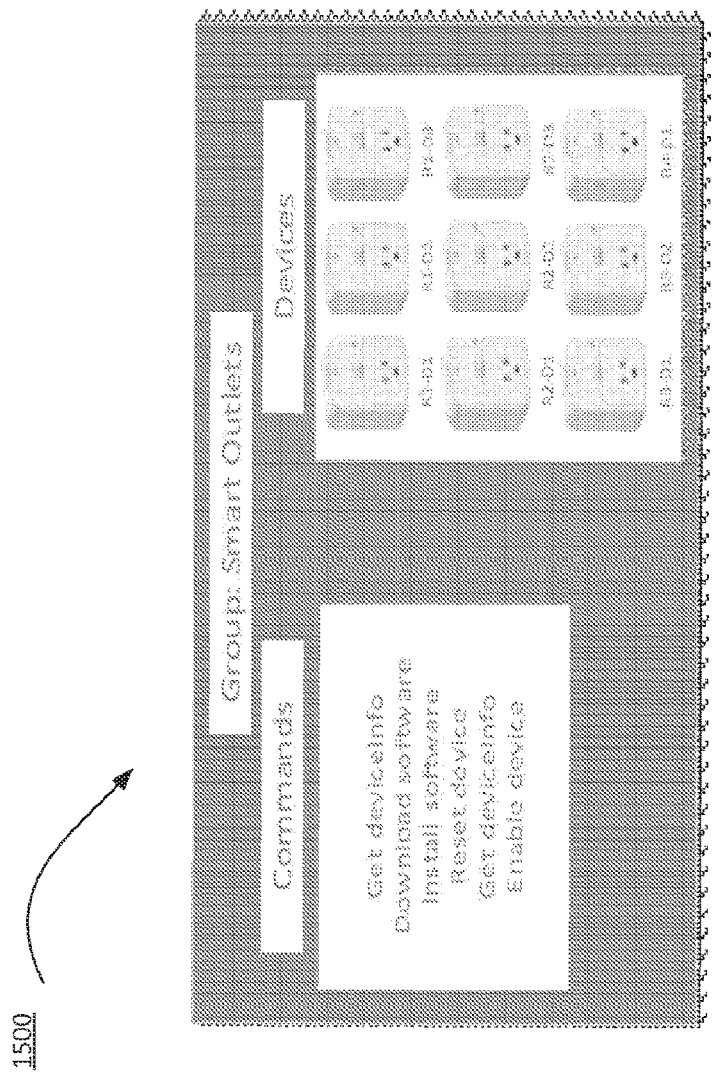
FIG. 15 illustrates a graphical user interface according to an embodiment of the application

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86. Display 86, may display sensory data in files or folders using embedded semantics names. In one embodiment, the display 86 may include a graphical user interface as shown in FIG. 15. Here, there GUI 1500 can display the <group> resource of an M2M server/gateway. For instance, the GUI 1500 can show a list of command to be executed on a group of device. Further, computing system 90 may contain network adaptor 97 that may be used to connect computing system 90 to an external communications network, such as network 12 of FIG. 1A and FIG. 1B.

According to the present application, it is understood that any or all of the systems, methods and processes described herein may be embodied in the form of computer executable instructions, e.g., program code, stored on a computer-readable storage medium which instructions, when executed by a machine, such as a computer, server, M2M terminal device, M2M gateway device, or the like, perform and/or implement the systems, methods and processes described herein. Specifically, any of the steps, operations or functions described above may be implemented in the form of such computer executable instructions. Computer readable storage media include volatile and nonvolatile, removable and non-removable media implemented in any method or technology for storage of information, but such computer readable storage media do not includes signals. Computer readable storage media include, but are not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other physical medium which can be used to store the desired information and which can be accessed by a computer.

Device Management Architectures

Device Management (DM) is the process in which a user at a centrally located site can configure, monitor, diagnose, and otherwise manage a remotely located device. This is especially valuable when the devices are mobile in nature or deployed in remote areas that make access to them difficult. Typically, a DM server at a central site downloads commands to be executed on the device. A DM client running on the device will receive these commands and process the state changes necessary to execute the desired operations. This communication mechanism between the DM server and the DM client is implemented using defined procedures and message formats and is known as a DM protocol. Two of the well-known DM protocols are the OMA DM Protocol and the BBF CPE WAN Management Protocol. Another emerging DM protocol is the OMA LWM2M Protocol.

FIG. 2A illustrates the OMA DM Protocol architecture 200 in which a DM Server 210 sends device management commands to DM Clients running on M2M devices 230. The DM Client maintains a set of Managed Objects (MO) within a resource structure referred to as the DM Tree 210A. These MOs are used to manage a particular function on the device such as software updates. The management commands operate on the nodes of the DM Tree and may cause state changes within the device.

FIG. 2B illustrates a general system 250 for delivering commands from the M2M Service layer 260 through a M2M Interface 270 to a DM Layer 280 including the DM Server 210 which is in communication with devices 230.

Figure 3:
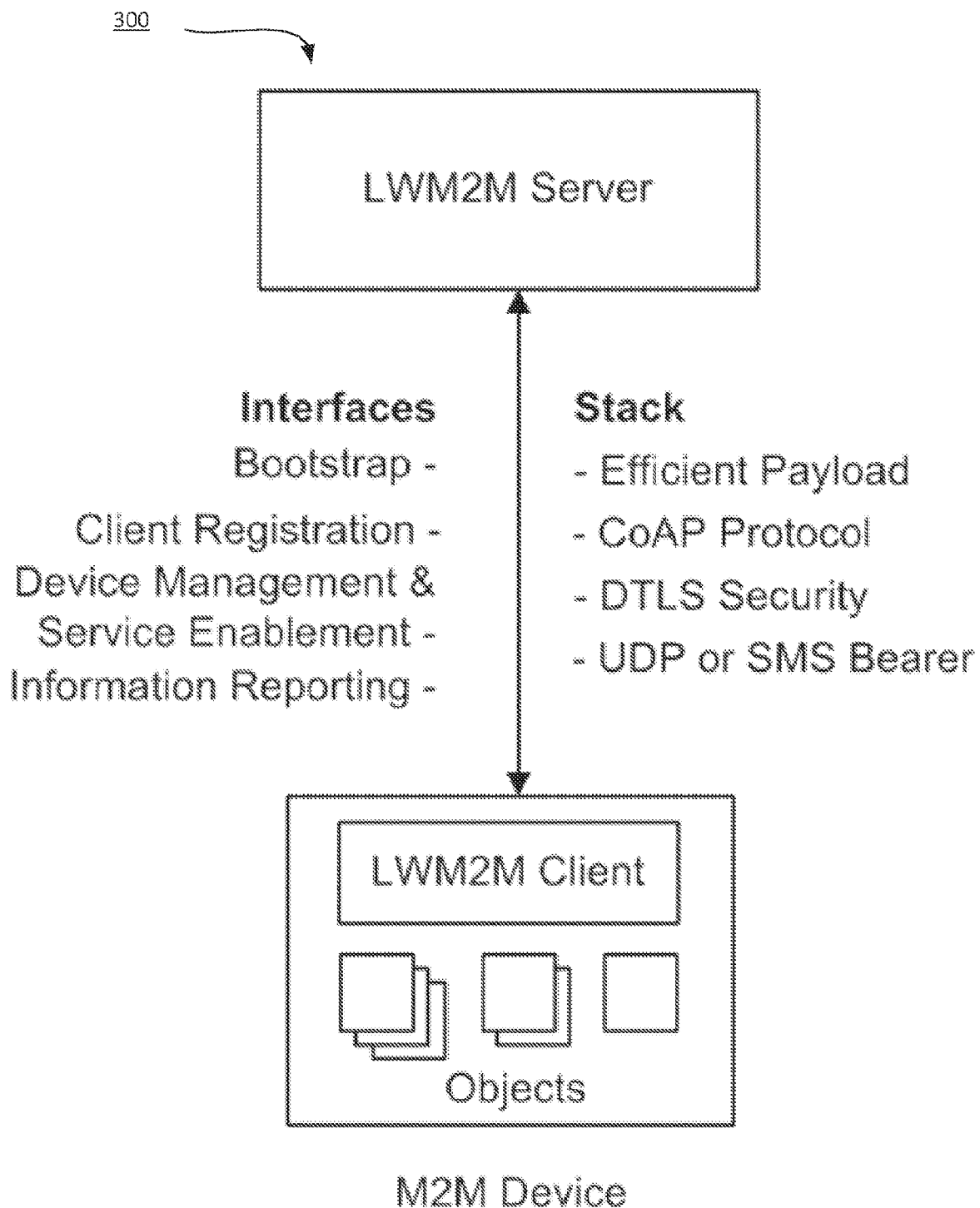
FIG. 3 illustrates the interface between a LWM2M Server and a LWM2M Client on a M2M device according to an embodiment of the application.

The OMA LWM2M Protocol provides a similar client-server architecture in which a LWM2M Server manages a LWM2M Client running on a device. FIG. 3 illustrates the LWM2M architecture 300 and the different interfaces provided. These interfaces focus on communications between the LWM2M Server and the LWM2M Client—there is no support for group operations in which a LWM2M Server can manage multiple LWM2M Clients on different devices. Operations are performed on Objects that reside on the device.

BBF CPE WAN Management Protocol

Figure 4:
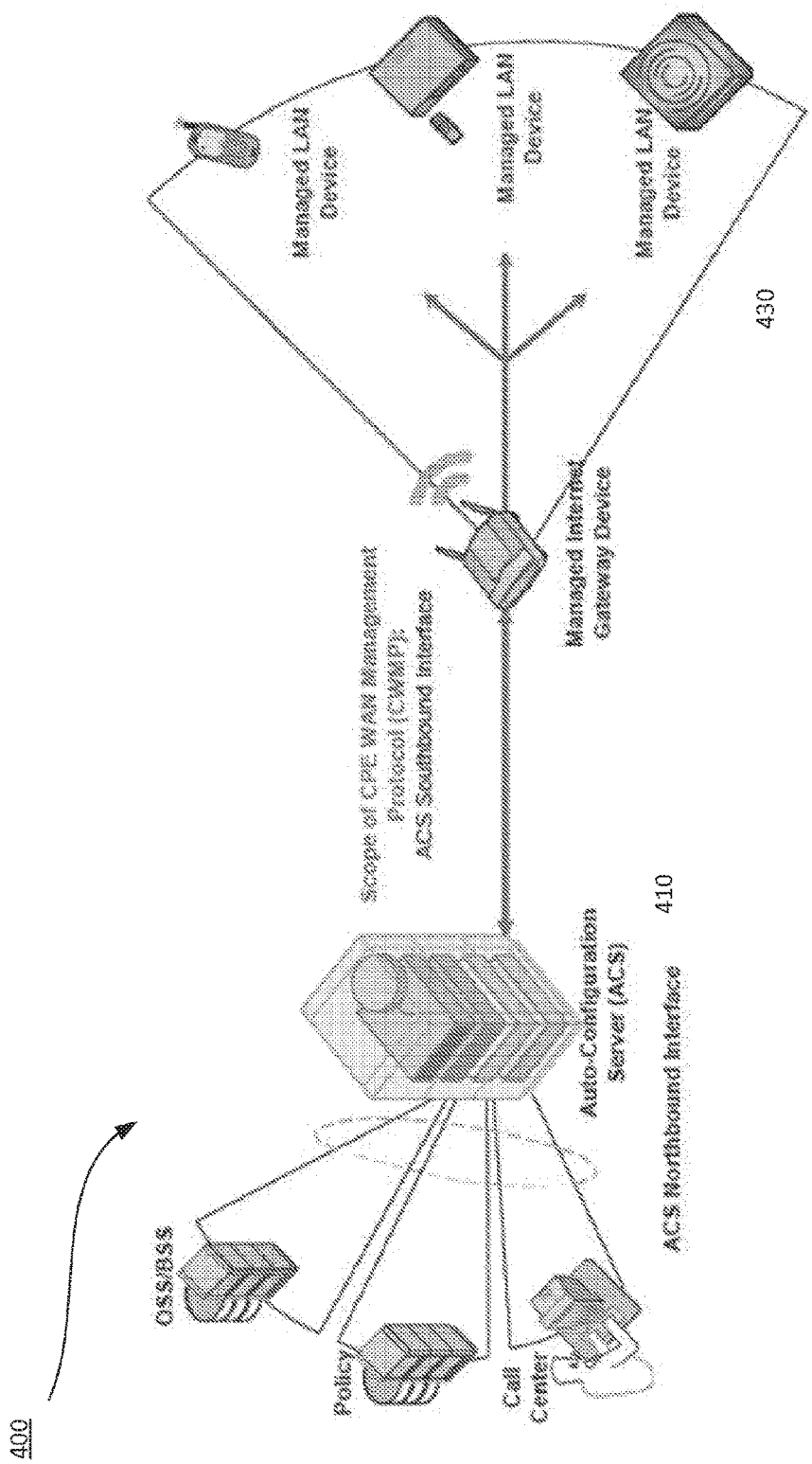
FIG. 4 shows the BBF TR-069 CPE WAN Management Protocol architecture where an Auto-Configuration Server (ACS) is used to manage Customer Premises Equipment (CPE) devices according to an embodiment of the application.

FIG. 4 illustrates the BBF TR-069 CPE WAN Management Protocol architecture 400 where an Auto-Configuration Server (ACS) 410 is used to manage Customer Premises Equipment (CPE) devices 430. The ACS uses Remote Procedure Calls (RPC) to perform management operations on the data models of the CPE devices. The ACS will provide each CPE the details of the multicast group to join to initiate the file transfer. In addition, provisions are made in some RPC calls to allow an ACS the ability to set or get multiple parameter values from the same CPE. These provisions are only enabled for the corresponding RPC call and are limited to the same CPE.

Service Layer Architecture

Figure 5:
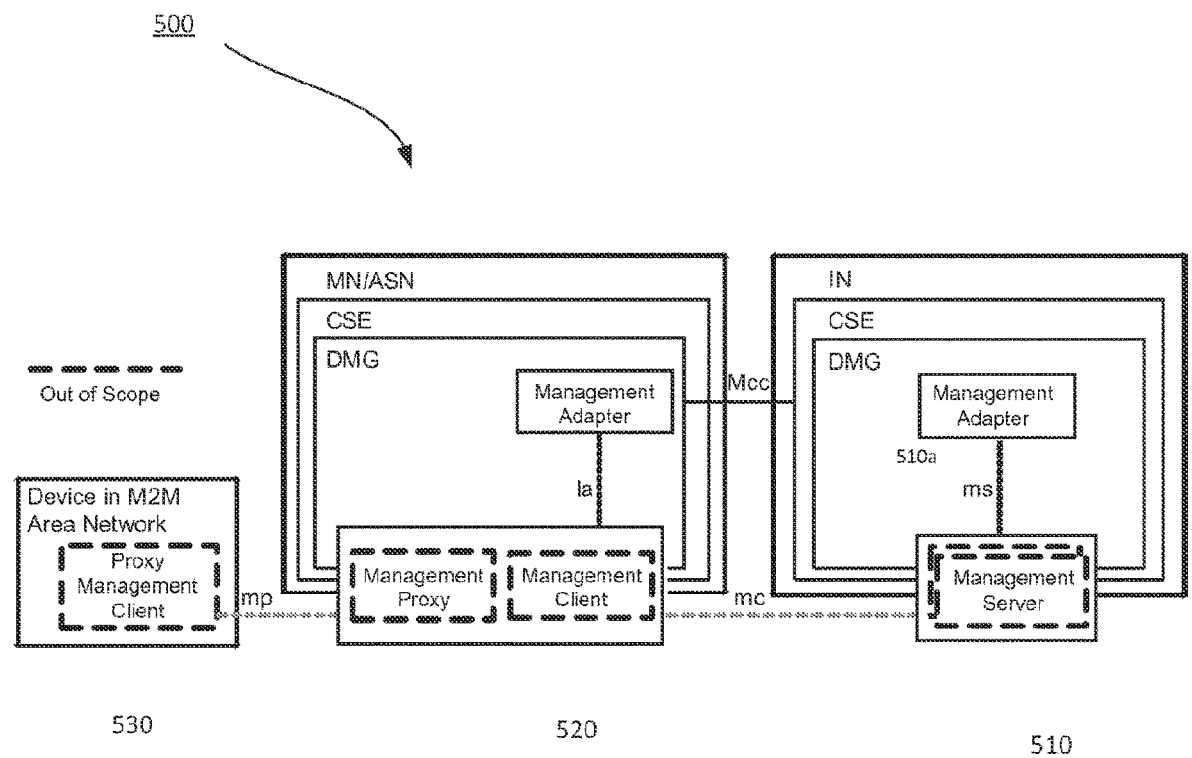
FIG. 5 illustrates Service Layer architecture where a Management Adapter translates Service Layer APIs to DM commands according to an embodiment of the application.

A Service Layer (SL) is a horizontal software platform operating at the application layer that offers various services to its users. Some of the services offered are Discovery, Group Management, Data Management and Repository, Location Services, etc. An additional service offered by the SL is device management, which takes advantage of existing DM protocols and infrastructures. As shown in FIG. 5, communications between the SL 510 which are the IN/CSE/DMG boxes and a DM Server 520 which is the Management Server box are handled by a management adapter 510a that translates SL primitive APIs to DM commands. Within the DMG is the management adapter which then interfaces to a Management or DM Server. Within oneM2M architecture, management type resources <mgmtObj> and <mgmtCmd> are defined which are mapped to OMA DM, LWM2M, and BBF CWMP objects.

High Level Architecture

Figure 6:
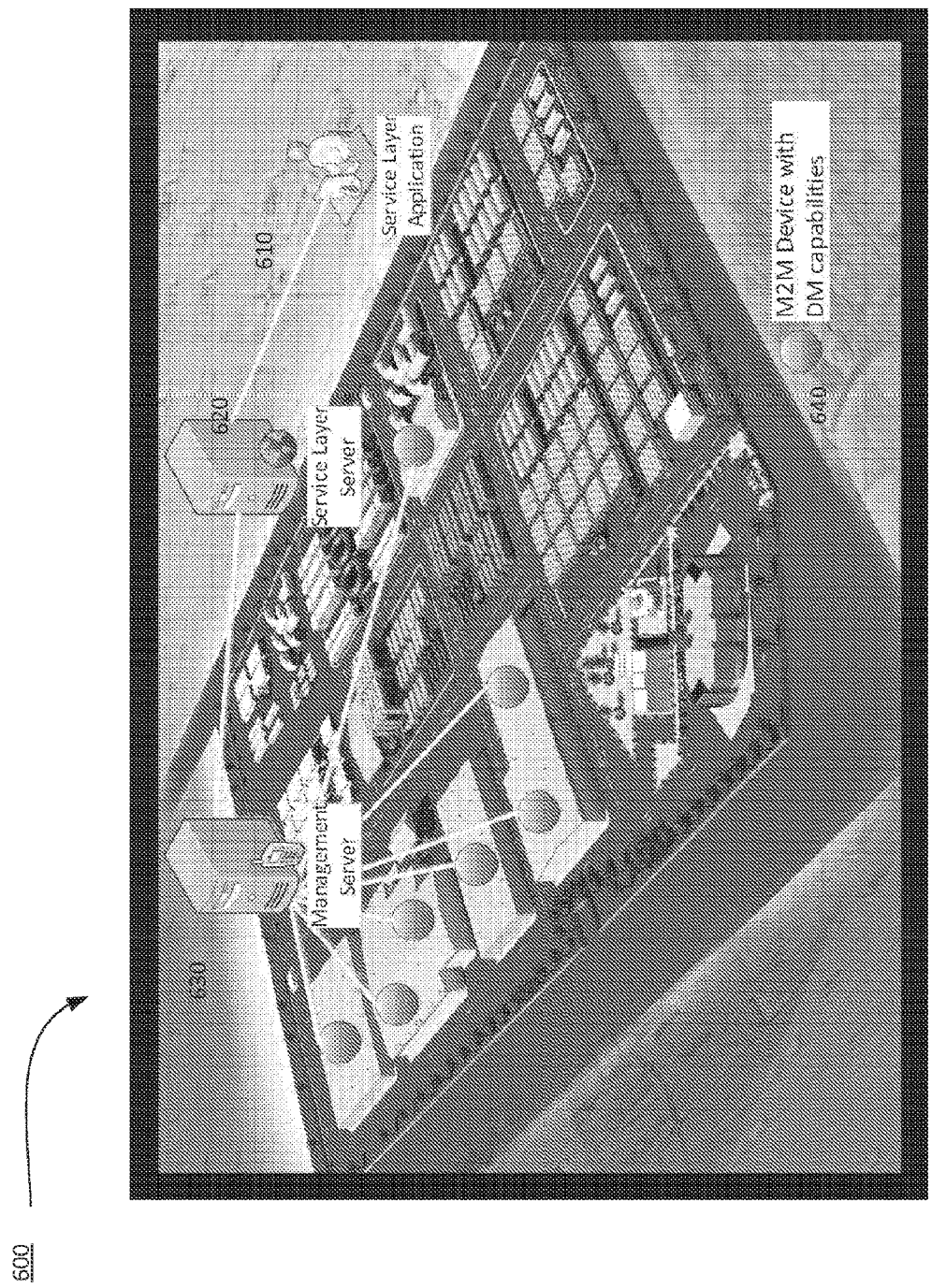
FIG. 6 illustrates a use case example of the management operations on a group of devices according to an embodiment of the application.

According to an aspect, an exemplary system for group operations between a SL and a ML is illustrated in FIG. 6. According to FIG. 6, the system is based upon a campus for a company. Here, the SL application 610 is in communication with a SL server 620. The SL server 620 is in communication with a DM or Management Server 630. The Management server 630 is in communication with plural M2M devices with DM capabilities 640.

Figure 7:
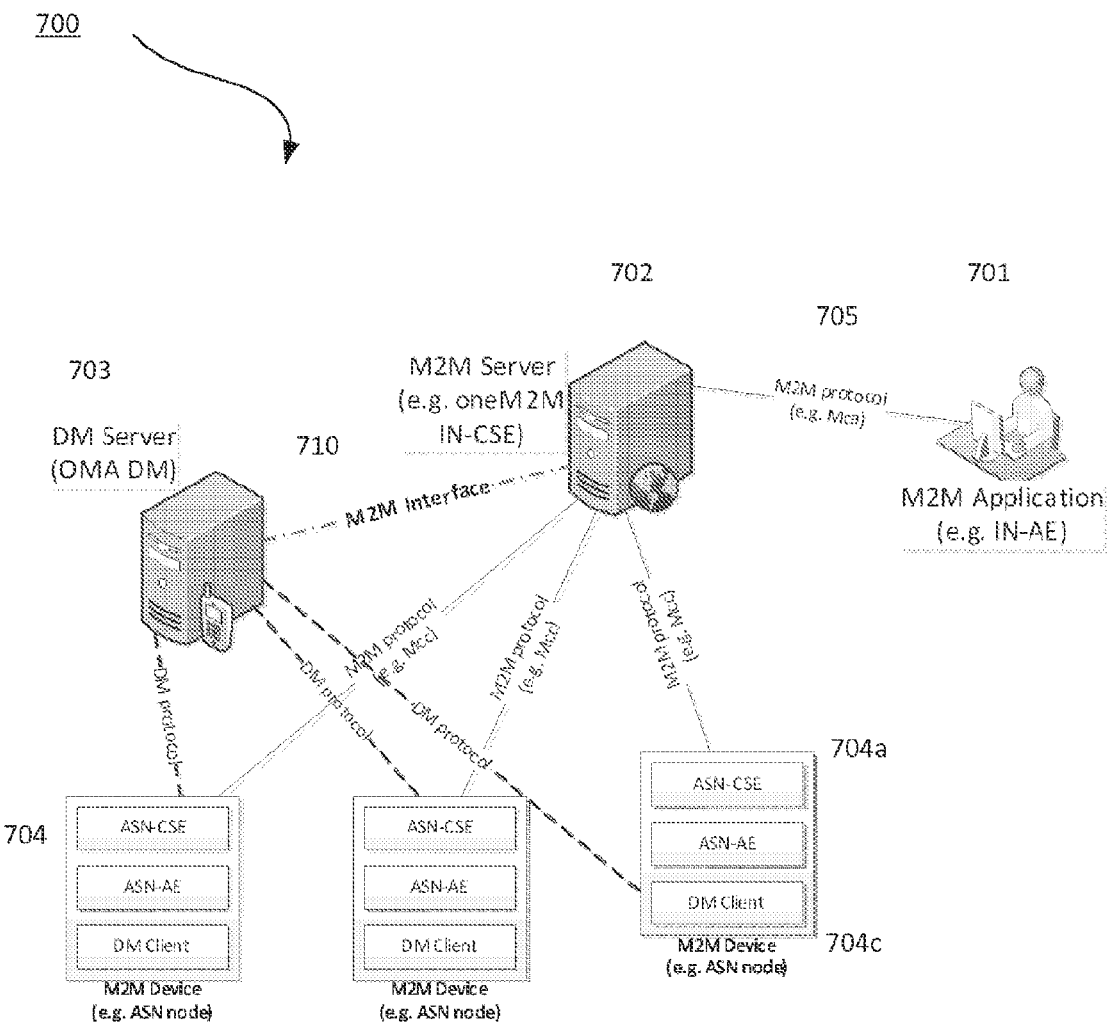
FIG. 7 illustrates an end-to-end M2M and DM integration architecture according to an embodiment of the application.
Figure 8:
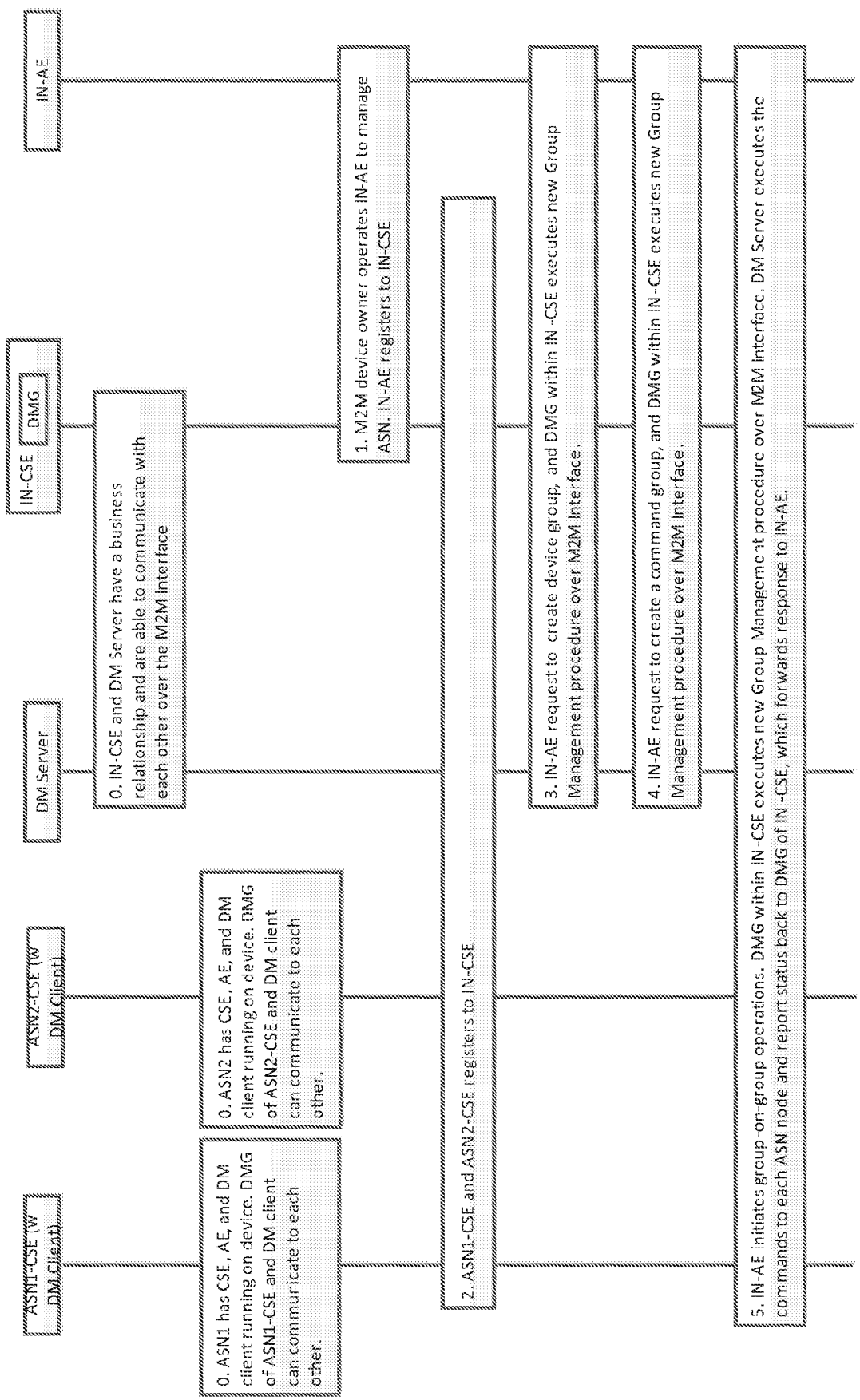
FIG. 8 illustrates a call flow for end-to-end DM operation according to an embodiment of the application.

FIG. 7 illustrates an end-to-end architecture 700 of the integration of DM architecture with a SL server such as oneM2M. The M2M protocol 705 offers communications between the M2M Application 701, e.g., IN-AE and the M2M Server 702, e.g., oneM2M IN-CSE. The M2M Interface 710 is currently being defined to offer communications between a M2M server 702 and a DM server 703. The DM protocol offers communications between the DM server 703 and the M2M devices 704, e.g., ASN node. Each ASN node 704 contains ASN-CSE, ASN-AE, and DM client software. For instance, the DMG in the ASN-CSE 704a and DM Client 704c can communicate directly to each other The high-level call flows for the embodiment in FIG. 7 are illustrated in FIG. 8. Each of the steps is denoted by a roman numeral, e.g., 0, 1, 2. In Step 0, the IN-CSE and DM Server have a business relationship and are able to communicate with each other over the M2M Interface. Moreover, each of ASN1 and ASN2 has a CSE, AE and DM client running on the devices. A DMG of ASN1 and ASN2 and the DM client can communicate with each other.

Next, a device owner operates a M2M application IN-AE to manage ASN devices by registering with the IN-CSE through the M2M protocol in Step 1. In Step 2, each of the plural ASN nodes registers with the IN-CSE using the M2M protocol.

The IN-AE initiates a request to IN-CSE to set up a group that contains the plural ASN nodes according to Step 3. New IN-CSE <group> attributes to support this feature are proposed and will be described in further detail below. Moreover, DMG within IN-CSE uses new M2M Interface Group Management procedures to create a group of devices in the DM Server as will be described in further detail below. Moreover, the DM Server responds with a created message to DMG in IN-CSE. The IN-CSE informs the IN-AE that the group was successfully created.

In Step 4, the IN-AE initiates a request to IN-CSE to create a group of DM commands. Namely, new IN-CSE resources and attributes are proposed to support this feature as will be discussed in more detail below. The DMG within IN-CSE uses the new M2M Interface Group Management procedure to create a group of commands in DM Server. The DM Server responds with a created message to DMG in IN-CSE. In turn the IN-CSE responds to IN-AE that the group was successfully created.

In Step 5, the IN-AE initiates a request to IN-CSE to perform group-on-group operations. Here, the new IN-CSE addressing and attributes to support this feature are proposed. The DMG within IN-CSE uses new M2M Interface Group Management procedures to execute group-on-group operations in the DM Server. In turn, the DM Server responds with an acknowledge message to DMG. Each ASN node will respond to the DM Server after the DM commands are successfully executed. Upon receiving one or more of the responses from the DM Server, the DM Server responds with an "execute success" message to DMG. Preferably, the DM Server will respond with an execute success message after all of the ASN responses are received. In turn, the IN-CSE responds to IN-AE that group-on-group operation were successfully.

Figure 9:
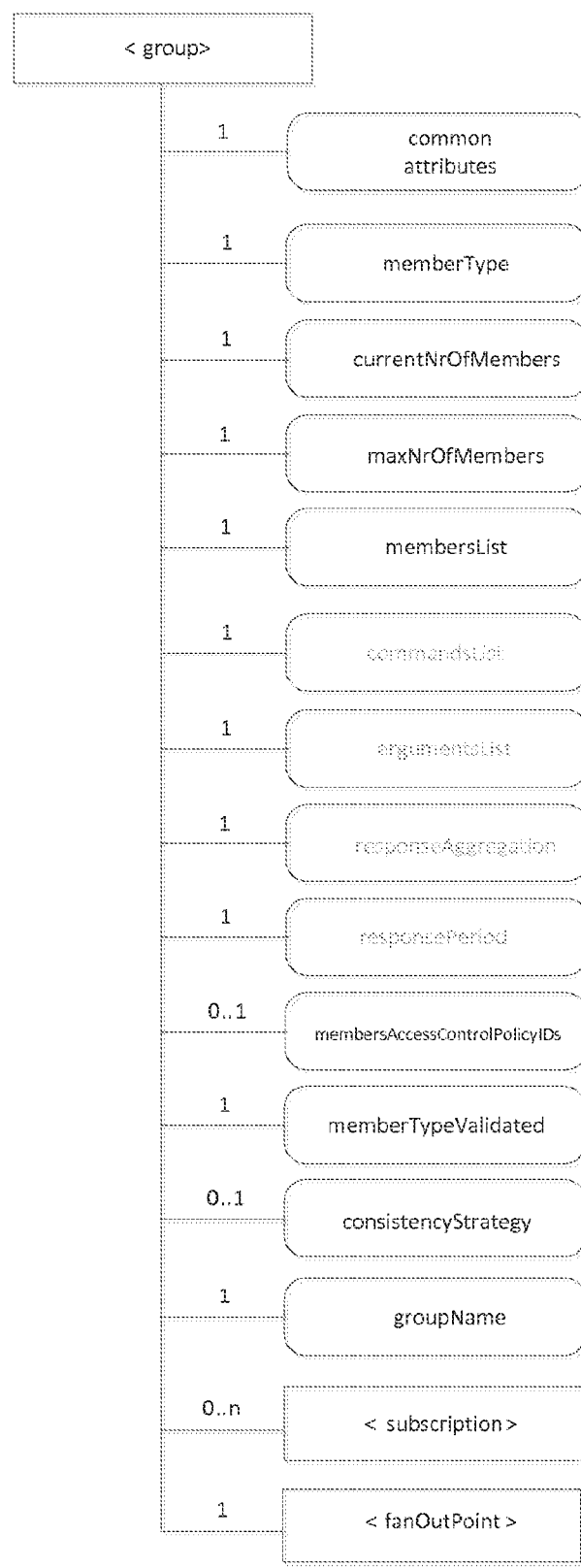
FIG. 9 illustrates oneM2M <group> resources according to an embodiment of the application.

As shown in FIG. 9, the <group> resource includes the following child attributes: (i) common attributes; (ii) memberType; (iii) CurrentNrOfMembers; (iv) maxNrOfMembers; (v) membersList (vi) commandsList, (vii) argumentsList, (viii) responseAggregation; (ix) responsePeriod; (x)

membersAccessControlPolicyIDs; (xi) memberTypeValidate; (xii) consistencyStrategy; (xiii) groupName; (xiv) <subscription>; and (xv)<fanOutPoint> and (xvi) commandBlocking.

Enhancements to oneM2M Service Layer for Group Management

According to another embodiment, two group management enhancements are made to the oneM2M architecture. The first enhancement is presented in the <group> resource that allows for performing multiple commands on a group of ASN devices. This is termed group-on-group operations. In one embodiment, this operation may initiated by an enhancement to the fanOutPoint addressing mechanism provided in oneM2M, e.g., <fanOutPoint>. The second enhancement is introduced in the <mgmtCmd> resource in which the execTarget attribute is expanded to allow for specifying a group ID. This addition to the execTarget fans out the management command to members of the group.

Table 2 below relates to the first enhancement to the existing oneM2M <group> resource and <fanOutPoint> addressing scheme to enable more advanced uses of DM. In particular, Table 2 lists the new attribute additions including, for example, commandsList, commandBlocking, argumentsList, responseAggregation and responsePeriod. Moreover, Table 2 includes a change to the memberType attribute for the oneM2M <group> resource. For, example, whenever the commandList is specified, the type must be a DM related resource such as <mgmtObj> or <mgmtCmd>, etc. This attribute also relates to OMA DM, OMA LWM2M or BBF CWMP resources or attributes that are not mapped to an oneM2M resource or attribute. By so doing, this will ease the efforts of translation by the DMG by providing a one-to-one correspondence between the service layer resources and the management layer resources. In Table 2, RW, RO and WO stand for Read/Write, Read Only, and Write Once, respectively. Moreover, OA stands for Optional Announced under "<groupAnnc> Attributes" in Table 2.

TABLE 2

| New Attributes added to <group> | Multiplicity | RW/ RO/ WO | Description | <groupAnnc> Attributes |
|---|---|---|---|---|
| memberType | 1 | WO | It is the resource type of the members resources of the group if all members resources (including the members resources in any sub-groups) are of the same type. Otherwise, it's a type of 'mixed'. Whenever commandsList is specified, the type must be a DM related resource such as <mgmtObj>, <mgmtCmd>, etc. | OA |
| currentNrOfMembers | 1 | RO | Current number of members in a group. It is limited by the maxNrOfMembers. | OA |
| maxNrOfMembers | 1 | RW | Maximum number of members in the <group>. | OA |
| membersList | 1 | RW | List of zero or more member URIs referred to in the remaining of this specification as memberID. Each URI (memberID) should refer to a members resource or a (sub-) <group> resource of the <group>. | OA |
| commandsList | 1 | RW | "List of zero or more commands (OMA DM or RPC) or operations (CRUD) that corresponds with each member URI found in membersList. OMA DM Commands will be represented by the corresponding CRUD operations while RPC is specified by URIs to <mgmtCmd> resources. | OA |
| commandBlocking | 1 | RW | When commandsList is specified, this attribute is used to indicate how the servers should handle cases in which a command fails to execute properly. Two modes are available: blocking causes the server to stop processing and return an error while non-blocking allows a server to continue processing with the next command. | |
| argumentsList | 1 | RW | List of zero or more arguments for use in creating fanout group requests; arguments are denoted as $arg1, $arg2, etc. The numeral corresponds to the order of the arguments in the list. Arguments can be inserted into other attributes of the <group> resource using the "$arg#" notation where # denotes the number associated with the argument list order beginning with 1. | OA |
| responseAggregation | 1 | RW | Provides mechanisms to indicate how CSE should send responses to group operation: 0 - Aggregate all responses into one 1 - Send individual response as they are available 2 - Aggregate responses for a fixed period and send response after period expired 3 - Queue responses and send periodically until all response are sent 4 - Only send success responses 5 - Only send failed responses | OA |

TABLE 2-continued

| New Attributes added to <group> | Multiplicity | RW/ RO/ WO | Description | <groupAnnc> Attributes |
|---|---|---|---|---|
| responsePeriod | 1 | RW | Time period associated with responseAggregation modes 2 and 3 | OA |
| membersAccessControlPolicyIDs | 0 . . . 1 | RW | URIs of the <accessControlPolicy> resources defining who is allowed to access the <fanOutPoint> resource. | OA |
| memberTypeValidated | 1 | RO | Denotes if memberType of all members resources of the group has been validated. | OA |
| consistencyStrategy | 0 . . . 1 | WO | This attribute determines how to deal with the <group> resource if the memberType validation fails. Which means delete the inconsistent member if the attribute is ABANDON_MEMBER; delete the group if the attribute is ABANDON_GROUP; set the memberType to "mixed" if the attribute is SET_MIXED. | OA |
| groupName | 0 . . . 1 | RW | Human readable name of the <group>. | OA |

According to a further embodiment, once the above attributes are added, a <group> resource is created to specify commands or operations for each entry in the membersList. A group of commands can then be created by specifying the memberType attribute to <mgmtObj> or <mgmtCmd> and specifying the commandsList attribute.

According to another embodiment, the following OMA DM commands enable a software download and install operation of an application using arguments, e.g., $arg#, as defined in the argumentsList:
Delete—$arg1/$arg2/name
Create—$arg1/$arg2/name
Update—$arg1/$arg2/URL
Execute—$arg1/$arg2/Install
Retrieve—$arg1/$arg2/activeStatus In this example, we have specified two arguments—$arg1 and $arg2—used to construct the URIs of the members of the group. Table 3 as provided below shows the entries for the commandsList, membersList, and argumentsList attributes for this group. Within the argumentsList, there is a string reference to "{group}". This indicates that the argument is to be derived from the members of another group. The ordering of the argumentsList provides for the numeral used to reference the argument—$arg1 references {group} and $arg2 references myApp. These references can then be used in other attributes within the <group> resource. The DMG in the CSE will perform the substitution prior to generating the fanout requests.

TABLE 3

| commandsList | membersList | argumentsList |
|---|---|---|
| Delete | $arg1/$arg2/name | $groupID |
| Create | $arg1/$arg2/name | myApp |
| Update | $arg1/$arg2/URL | |
| Execute | $arg1/$arg2/Install | |
| Retrieve | $arg1/$arg2/activeStatus | |

According to yet another embodiment, once the group of commands has been created, a group of devices may be designated for applying the commands to. The device group will be created in the normal oneM2M <group> procedure. If the purpose of the group is to manage devices through a DM Server, the membersList URIs will point to a device-Label attribute of the [deviceInfo] <mgmtObj> resource. This would require the group's members Type to be of <mgmtObj> resource. In one embodiment, this application proposes expanding the addressing scheme of the fanOut-Point virtual resource to include the ability to specify <group> resource after the fanOutPoint to trigger group-on-group operation. Two existing ways to address the fanOut-Point include: (i) /cseBase/ . . . /<group>/fanOutPoint; and (ii)/cseBase/ . . . /<group>/fanOutPoint/<relative_URI>

Alternatively, the <relative_URI> specifies a child resource or attribute of the parent resource provided by the membersList URI. To enable group-on-group operations, this disclosure proposes adding a third addressing scheme: /cseBase/ . . . /<group>/fanOutPoint/<absolute_URI>. Here, the <absolute_URI> points to a <group> resource of memberType <mgmtObj> or <mgmtCmd>. Moreover, the CSE will still fan out the request but instead of using the operation of the original request, it will use the commands specified in the group pointed to it by the <absolute_URI>.

Figure 10:
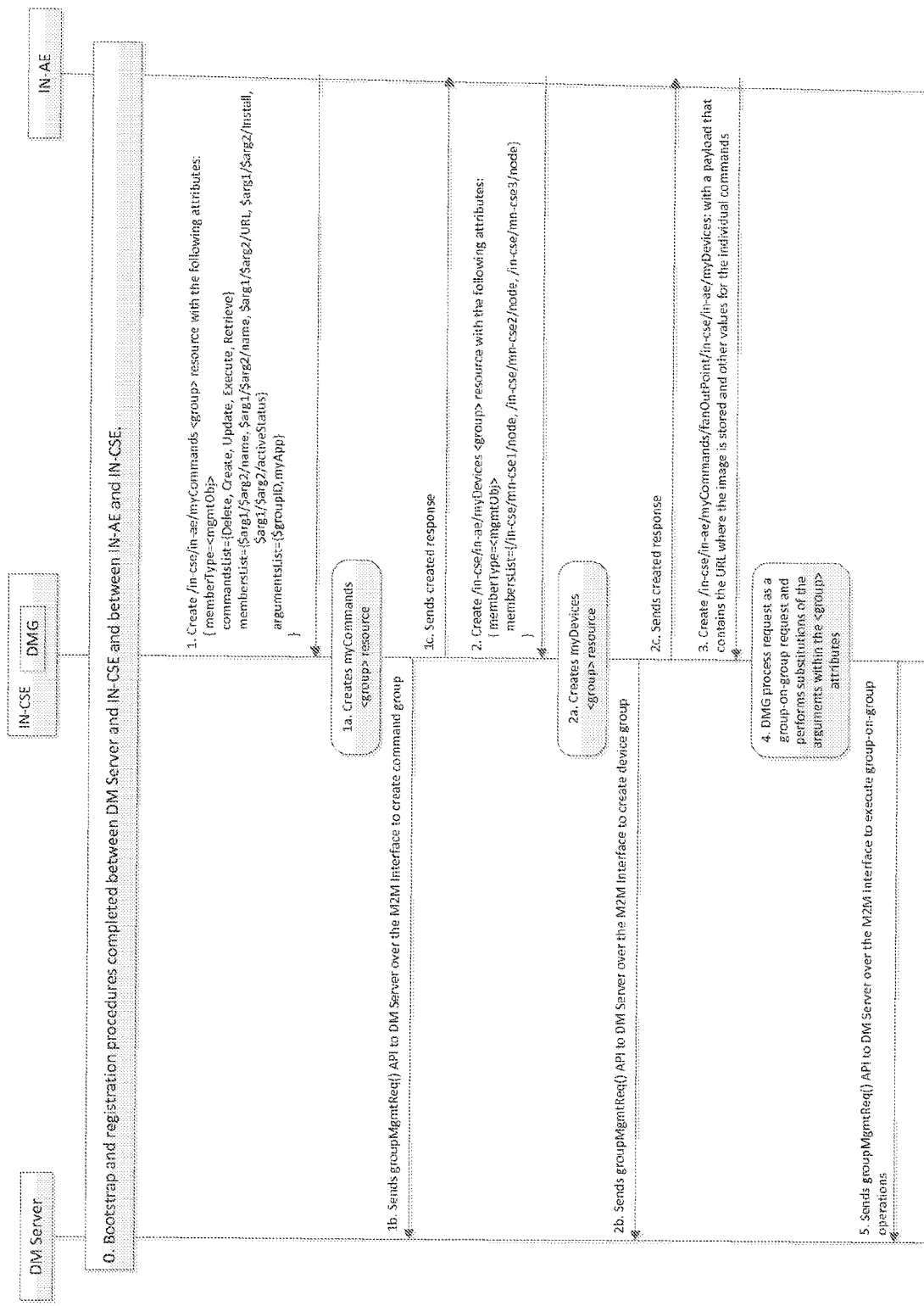
FIG. 10 illustrates a call flow showing group-on-group operations according to an embodiment of the application.

This group-on-group mechanism and the call flow are shown in FIG. 10. IN-AE creates /in-cse/in-ae/myCommands <group> resource with memberType set to <mgmtObj> and using the attributes specified in Table 2. It is also envisaged to a person skilled in the art that responseAggregation may also be specified here to indicate how responses are to be processed. As an initial matter, Step 0 describes the completed bootstrap and registration procedures as described above in FIG. 8 between the DM server and IN-CSE, and between the IN-AE and IN-CSE. In Step 1, the IN-AE requests to create a <group> resource called "/in-cse/in-ae/myDevices." In the request, the memberType is set to <mgmtObj>. The commandList is set to Delete, Create, Update, Execute and Retrieve. The memberList is set to $arg1/$arg2//name, $arg1/$arg2/name, $arg1/$arg2/URL, $arg1/$arg2/Install, $arg1/$arg2/activeStatus. The argumentsList is set to $groupID, myApp. In Step 1a, the DMG 702a in IN-CSE creates a myCommands <group> resource. In Step 1b, the DMG sends group management request API to the DM server over the M2M Interface to create a command group. In Step 1c, the DMG sends a created response to the IN-AE.

In Step 2, the IN-AE initiates a request to create a device <group> called/in-cse/in-ae/myDevices. The group includes the following attributes: memberType=<mgmtObj> and membersList={/in-cse/mn-cse1/node, /in-cse/mn-cse2/node, /in-cse/mn-cse3/node}. The DMG 702a creates a myDevices <group> resource in Step 2a. In Step 2b, the DMG sends group management request API to the DM server over the M2M Interface to create a device group. In Step 2c, the DMG sends a created response to the IN-AE. It is envisaged to a person skilled in the art that Steps 2, 2a, 2b and 2c may occur before, after or concurrent with Steps 1, 1a, 1b and 1c.

Next, in Step 3, the IN-AE requests the DMG to create "/in-cse/in-ae/myCommands/fanOutPoint/in-cse/in-ae/myDevices" with a payload that contains the URL where the image is stored and other values for the individual commands. IN-AE triggers group-on-group operation by issuing the following command. The trigger in this case is provided by the absolute URI to a <group> resource with memberType <mgmtObj>. In this example, only the Create operation is supported.

op: CREATE
fr: /in-cse/in-ae
to: /in-cse/in-ae/myCommands/fanOutPoint/in-cse/in-ae/myDevices
cn: [payload contains the URL where the image is stored and other values for the individual commands]
gid: [the group identifier of myCommands]

Next, in Step 4, the DMG within IN-CSE processes the request as a group-on-group request. The DMG performs the substitutions specified by the argumentsList prior to executing the groupMgmtReq( ). In this example, argument $arg1 was specified as {group} and when the DMG performs the substitution, it will replace the $arg1 argument with each member of the group created in Step 2. For $arg2, the substitution is relatively simple: replace $arg2 with myApp. Table 4 below shows the results after all substitutions are completed.

TABLE 4

| commandsList | membersList |
|---|---|
| Delete | /in-cse/mn-cse1/node/myApp/name |
| Create | /in-cse/mn-cse1/node/myApp/name |
| Update | /in-cse/mn-cse1/node/myApp/URL |
| Execute | /in-cse/mn-cse1/node/myApp/Install |
| Retrieve | /in-cse/mn-cse1/node/myApp/activeStatus |
| Delete | /in-cse/mn-cse2/node/myApp/name |
| Create | /in-cse/mn-cse2/node/myApp/name |
| Update | /in-cse/mn-cse2/node/myApp/URL |
| Execute | /in-cse/mn-cse2/node/myApp/Install |
| Retrieve | /in-cse/mn-cse2/node/myApp/activeStatus |
| Delete | /in-cse/mn-cse3/node/myApp/name |
| Create | /in-cse/mn-cse3/node/myApp/name |
| Update | /in-cse/mn-cse3/node/myApp/URL |
| Execute | /in-cse/mn-cse3/node/myApp/Install |
| Retrieve | /in-cse/mn-cse3/node/myApp/activeStatus |

Further, the DMG sends a groupMgmtReq API to the DM Server over the M2M interface to execute group-on-group operations in Step 5.

It is envisaged to a person skilled in the art that the use of group management procedures for DM purposes can also be applied to service layer resources. In these cases, the memberType of the <group> resource will not be <mgmtObj> or <mgmtCmd> type resources and basic CRUD operations could be performed on group members. The commandsList and argumentsList attributes can be used as well as the group-on-group operations.

In yet a further aspect of the application, an enhancement to group management operations in oneM2M may include the use of <mgmtCmd> type resources. These resources are created in the IN-CSE's resource tree to represent management commands such as those used in the BBF CWMP (or TR-069) protocol. The <mgmtCmd> resource is created either by an IN-AE or by the CSE on the managed entity. The cmdType and execReqArgs attributes provide the type of command and command arguments associated with the <mgmtCmd> respectively. This information will be used by the management adapter to translate the <mgmtCmd> to a Remote Procedure Call (RPC). Once the <mgmtCmd> is specified, an AE can then execute the <mgmtCmd> resource to perform the indicated management operation on the remote entity. This is done by performing an update on the execEnable attribute of the <mgmtCmd> resource without any payload. The "to:" field of the request provides the remote entity CSE-ID where the management command is executed. After the hosting CSE performs the management command using the existing device management protocol, it creates an <execInstance> sub-resource to track the management operation. The AE can then retrieve the status from this <execInstance> resource at a later time.

In a further embodiment, an enhancement can be added to the <mgmtCmd> resource to support group operations. This enhancement is provided by specifying the "execTarget" attribute described above. The execTarget attribute can be expanded to include group IDs as valid values for the attribute in specifying the targets for the <mgmtCmd>. When an update is performed on execEnable, the host CSE will execute the <mgmtCmd> on the nodes specified in the membersList attribute of the <group> resource.

In yet even a further embodiment, an enhancement for <mgmtCmd> group operation is described including a combination of the execTarget attribute and the <group> resource. An AE can specify a group of <mgmtCmd> resources in the membersList of a <group> resource. It may also specify within each <mgmtCmd> resources for the targeted node or even a group ID using the execTarget attribute. This is an alternative vehicle for enhancing the group-on-group operations specified above for <mgmtCmd> resources. After the <group> resource is specified, the execution of the <mgmtCmd> resource is triggered using the fanOutPoint addressing scheme disclosed in detail above.

Figure 11:
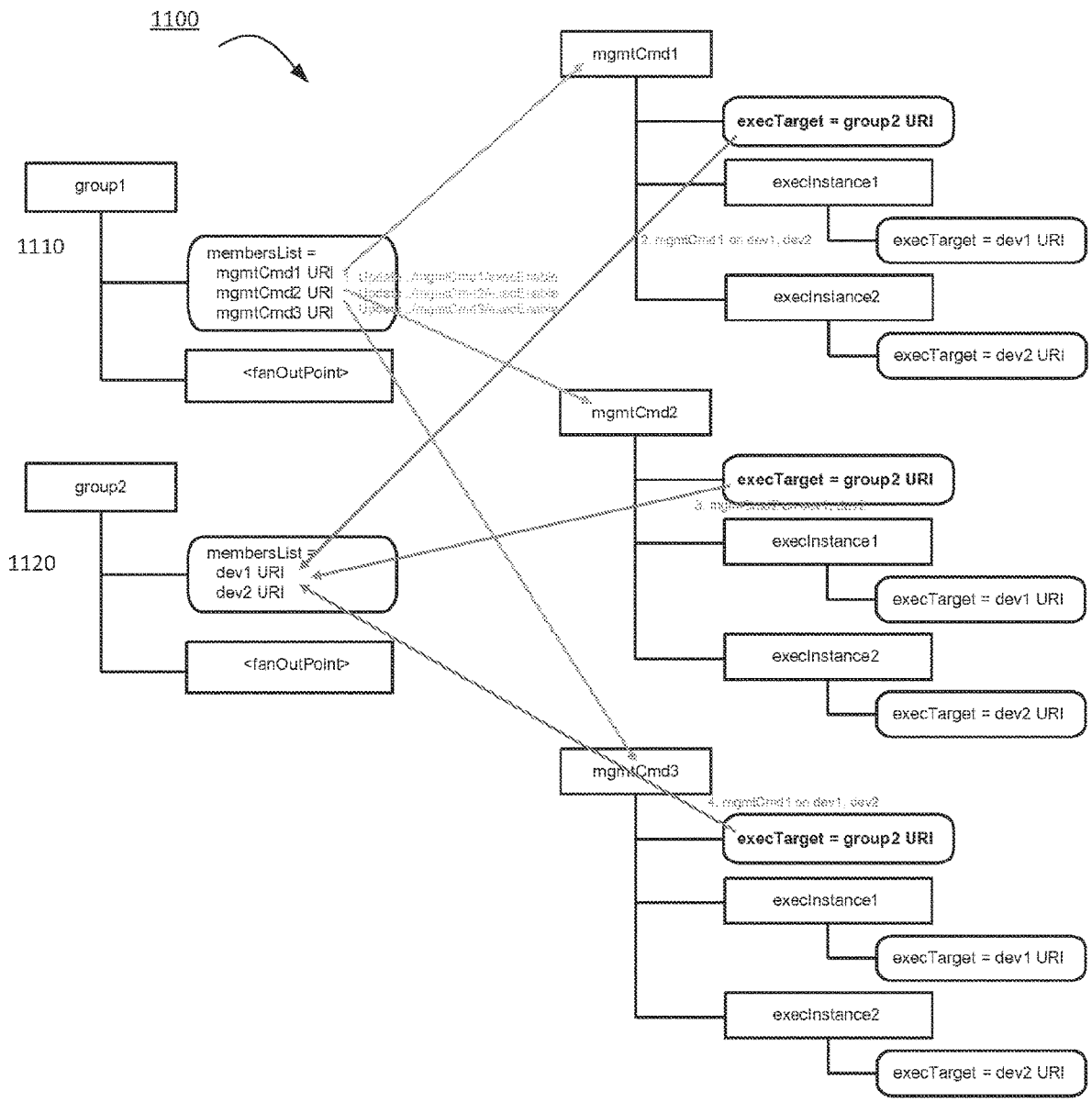
FIG. 11 illustrates group-on-group operations involving <mgmtCmd> resource according to an embodiment of the application.

According to an exemplary embodiment as shown in FIG. 11, there is disclosed an example of Group-on-Group operation 1100 involving use of the <mgmtCmd> execTarget attribute. Two groups are created. Group1 1110 contains the URIs of three mgmtCmd resources and group2 1120 contains 2 device URIs. The execTarget attribute of each of the <mgmtCmd> resources contains group2's URI. The group-on-group operation is triggered by the following operation: Update../group1/fanOutPoint/execEnable. The host CSE will then process the request as follows which is not limited to any order:

While extracting group1's membersList, the host CSE executes the following operations:
Update../mgmtCmd1/execEnable
Update../mgmtCmd2/execEnable
Update../mgmtCmd3/execEnable MgmtCmd1's execTarget specifies group2's URI. This will cause mgmtCmd1 to be executed on dev1 and dev2 as specified above. Similarly, mgmtCmd2's execTarget specifies group2's URI as well. This will cause mgmtCmd2 to be executed on dev1 and dev2 as specified above. MgmtCmd3's execTarget also specifies group2's URI. This will cause mgmtCmd3 to be executed on dev1 and dev2 as specified above. Notably, for each successful execution of mgmtCmds 1, 2, and 3, an associate <execInstance> resource is created for the corresponding device. This is shown in FIG. 11 as execInstance1 and execInstance2 resources under each of the three mgmtCmd resources. The execTarget attribute of these <execInstance> resource points to a member ID of group2 where the <mgmtCmd> was executed on. These <execInstance> resources are created by the host CSE that processed the group-on-group request.

M2M Interface Group Management Procedures

The DM group management procedure can be triggered whenever an operation is performed on an oneM2M <group> resource with memberType <mgmtObj> or <mgmtCmd>. These requests are processed by the DMG which will then perform substitution of any arguments and translate the result to the appropriate Group Management API call as described above in the application. The three main group operations are:

Device Group Operations: These operations allow a user to manipulate (CRUD) a group of devices with which to perform DM on. The memberType associated with this type of group is <mgmtObj> or <mgmtCmd> to differentiate from the service layer oriented group operations. This will indicate to the CSE that the request should be forwarded to the DMG for processing.

Command Group Operations: These operations allow a user to manipulate (CRUD) a group of commands (whether DM or not) upon which to perform upon a device or a group of devices. The memberType associate with this type of group is <mgmtObj> or <mgmtCmd> and the commandsList attribute must be specified to differentiate from the service layer oriented group operations. This will indicate to the CSE that the request should be forwarded to the DMG for processing.

Group-on-Group Operation: This operation allows a user to initiate a group-on-group operation in which a sequence of commands is performed on a group of devices. The operation is triggered by using the new addressing scheme for fanOutPoint in which an absolute URI pointing to a <group> resource of memberType <mgmtObj> is appended after the fanOutPoint virtual resource.

Figure 12:
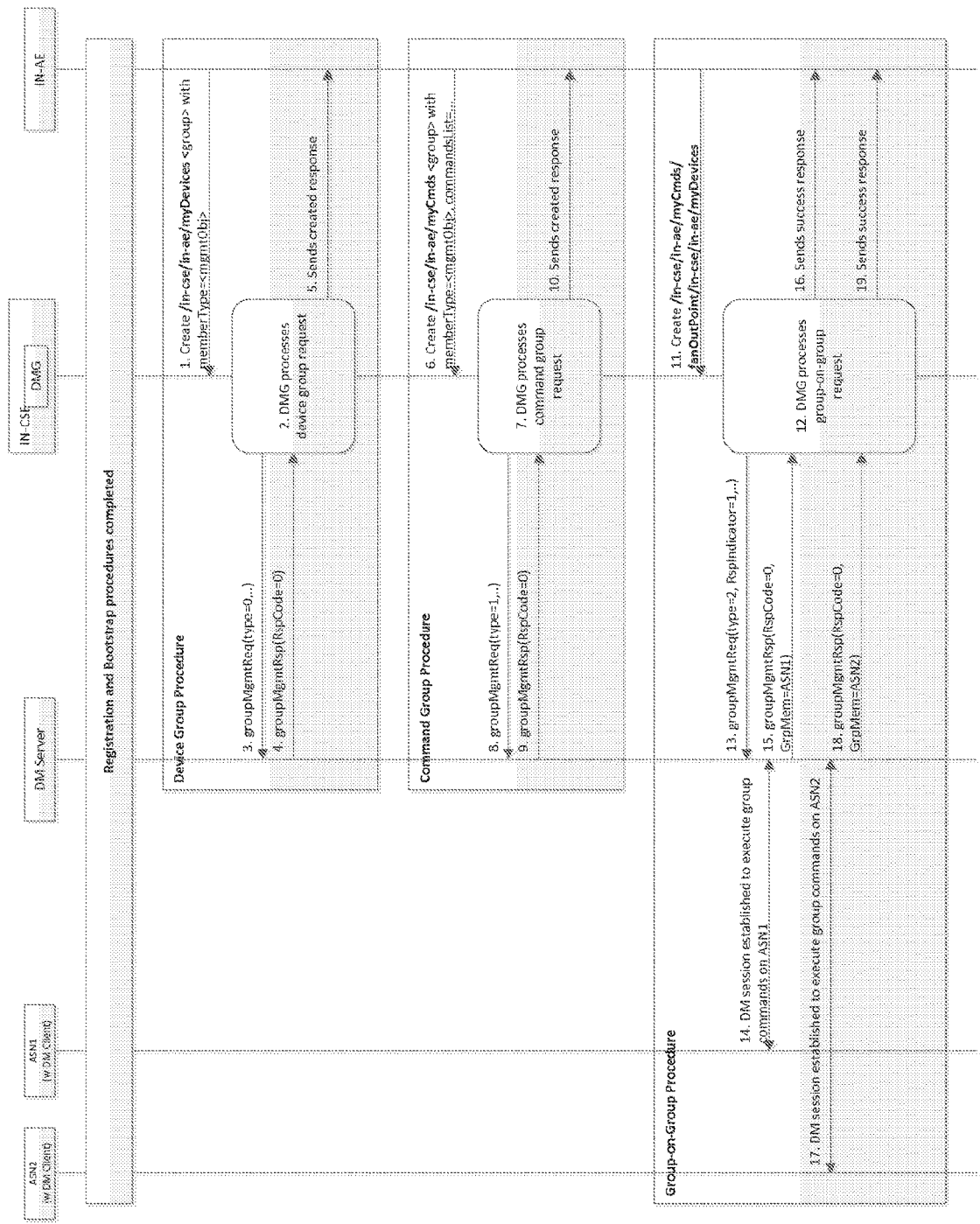
FIG. 12 illustrates M2M Interface Group Management Procedures according to an embodiment of the application.

FIG. 12 shows an example call flow that illustrates how the group management procedures operate. The steps in FIG. 12 are indicated by a Roman numeral. Here, two ASN nodes are managed by the IN-AE through the IN-CSE.

As an initial matter, the registration and bootstrap procedures indicated in FIG. 8 above are employed in Step 0. Next, in Step 1, the IN-AE requests to create myDevices <group> resource with memberType=<mgmtObj> and the membersList URIs points to deviceLabel attributes of [deviceInfo] resource. The DMG then process the request by first performing substitution if necessary in Step 2. If the argumentsList attribute is specified and argument references (denoted by $arg#) are used, the DMG substitutes the values in the argumentsList for each argument references found. Next, the DMG calls groupMgmtReq( ) API as described above according to Step 3. In this case, the type of request is 0 for device groups. In Step 4, the DM Server responds with a success response code. In Step 5, the IN-CSE sends a created response to IN-AE.

Next, IN-AE requests to create myCmds <group> resource with memberType=<mgmtObj> and specifies a list of commands in the commandsList attribute (Step 6). The DMG processes the command group request by first performing substitution if necessary (Step 7). If the argumentsList attribute is specified and argument references (denoted by $arg#) are used, the DMG substitutes the values in the argumentsList for each argument references found. In Step 8, the DMG calls the groupMgmtReq( ) API in Table 5. In this case, the type of request is 1 for command groups. The DM Server responds with a success response code (Step 9). Further, IN-CSE sends created response to IN-AE (Step 10). It is envisages that Steps 6-10 can occur before, after or concurrent with Steps 1-5.

According to a further embodiment, The IN-AE initiates a group-on-group operation by targeting the following URI: in-cse/in-ae/myCmds/fanOutPoint/in-cse-in-ae/myDevices (Step 11). The absolute URI is in-cse/in-ae/myDevices. Next, the DMG processes the request by first performing substitution, if necessary (Step 12). If the argumentsList attribute is specified and argument references (denoted by $arg#) are used, the DMG substitutes the values in the argumentsList for each argument reference found. Next, the DMG calls the groupMgmtReq( ) API described above (Step 13). In this case, the type of request is 2 for group-on-group operations and the RspIndicator is set to 1, which requests for individual responses from the group members. In Step 14, the DM Server establishes a DM session with the DM Client running on ASN1 and executes the commands in the myCmds group. Next, the DM Server sends a response with code=0 for success and GrpMember=ASN1 to indicate which member the response was received from (Step 15). IN-CSE sends success response to IN-AE (Step 16).

Steps 17-19 are substantially equivalent to Steps 14-16. Namely, the DM Server establishes a DM session with the DM Client running on ASN2 and executes the commands in the myCmds group (Step 17). Then the DM Server sends a response with code=0 for success and GrpMember=ASN2 to indicate which member the response was received from (Step 18). Further, the IN-CSE sends success response to IN-AE (Step 19).

M2M Interface Group Management API

According to yet another embodiment, once the DMG has completed the substitution found in the argumentsList, it then translates the request into the groupMgmtReq( ) API call. An example format is provided Table 5. The RspIndicator allows for specifying how responses from the individual devices are processed. This is useful for cases in which the processing latencies are highly variable and the requester wants to get real time updates on the status of the commands. In some cases, devices may be sleeping and it may take a long time before the commands may be executed. Having the ability to receive individual responses in this case is beneficial for the service layer to know which devices completed the operations.

TABLE 5

| groupMgmtReq(ServerID, SessionID, TokenID, Operation, Type, cmdBlocking, GrpLabel, RspIndicator, Payload) | |
|---|---|
| ServerID | The identification of the M2M Server making the request - this information was provisioned when the M2M Server and the DM Server bootstrapped to each other. |
| SessionID | Optionally, the session ID this request is associated with. The session ID in this case is the session created over the M2M Interface. |
| TokenID | Optionally, the token ID this request is associated with. This ID provides another mechanism other than the session ID in which the M2M Server can track requests to responses. |
| Operation | CRUD operation to be performed on the group resource in the DM Tree; Execute and Cancel operations can also be specified:<br>Create: create a group node in the DM Tree<br>Retrieve: retrieve a group node from the DM Tree<br>Update: update a group node in the DM Tree<br>Delete: delete a group node from the DM Tree<br>Execute: execute a group-on-group operation<br>Cancel: cancel an incomplete execution of a group-on-group operation |
| Type | The type of group operation to perform:<br>0: operation applies to a device group in the DM Tree<br>1: operation applies to a command group in the DM Tree<br>2: operation applies to a group-on-group operation |

TABLE 5-continued groupMgmtReq(ServerID, SessionID, TokenID, Operation,
Type, cmdBlocking, GrpLabel, RspIndicator, Payload)

| | |
|---|---|
| cmdBlocking | If type = 1, this parameter specifies how the DM Server should handle commands that failed to execute:<br>0: execution should proceed to next command after the failed command<br>1: execution should halt upon a failed command and an error message should be returned |
| GrpLabels | Depending on the operation, the group label(s) is(are) specified as follows:<br>For Create or Execute operations, this parameter can be specified to indicate the desired group name; it may also be null if a name is requested to be provided by the DM Server.<br>For RUD or Cancel operations, this parameter is required to be specified.<br>For group-on-group operations, two group labels are provided: one for a group of commands and the other for a group of devices. |
| RspIndicator | Provides mechanisms on how responses to group-on-group operation are to be processed by the DM Server:<br>0 - Aggregate all responses into one<br>1 - Send individual response as they are available<br>2 - Aggregate responses for a fixed period and send response after period expired<br>3 - Queue responses and send periodically until all response are sent<br>4 - Only send success responses<br>5 - Only send failed responses |
| Payload | When a create or update operation is specified, the payload contains the contents of the group members that is requested to be created or updated. |

An example of the response the DM Server sends back is provided in Table 6. When individual responses are requested (RspIndicator>0), the DM Server must indicate a group member as specified in Table 6. This allows the requester to correlate the response to a member.

TABLE 6 groupMgmtRsp(ServerID, RspID, RspCode,
RspNumber, GrpLabel, Payload)

| | |
|---|---|
| ServerID | The identification of the DM Server sending the response - this information was provisioned when the M2M Server and the DM Server bootstrapped to each other. |
| RspID | This can either be a SessionID or TokenID specified in the request message and use to correlate request and response(s). |
| RspCode | Specifies if the request was successfully processed:<br>0 = Success<br>1 = Fail to create device group<br>2 = Fail to create command group<br>3 = Fail to execute group-on-group operation successfully |
| GrpMember | For cases in which the RspIndicator is not zero, the group member ID is given so the response can be correlated with a member. |
| GrpLabel | If a group label was not specified in the request, then the label assigned by the DM Server is specified here. For group-on-group operations, two group labels are provided. |
| Payload | For Retrieve operations, the payload contains the resource data requested. |

Management Layer Updates

Figure 13:
FIG. 13 illustrates OMA DM Group MO for group management support according to an embodiment of the application.

In even a further embodiment, management layer updates within management layer architectures are described. Here, updates are needed to support the M2M Interface and the enhanced group management procedures. The response message formats to the new M2M Interface group management procedures have been described in detail above. The support of the enhanced group management procedures is described in more detail below FIG. 13 shows an exemplary embodiment of a proposed Group MO in OMA DM Protocol that could be used for supporting the enhanced group management operations specified in this disclosure. Within the MO, three main interior nodes are defined: CommandGroup, DeviceGroup, and GroupStatus. The CommandGroup node provides for configuring a group of commands and is mapped to the groupMgmtReq's type parameter set to 1. Any request involving this type will create child resources in this node. The DeviceGroup node provides for the ability to group devices together and is mapped to the groupMgmtReq's type parameter set to 0. When a request is made to create a group of devices, a child node is created under this interior node. Finally, the GroupStatus node is used by the DM Server to process group-on-group operations. The DM Server will create a child node in GroupStatus to provide status based on the RspIndicator setting and save off the state as each status is obtained. After the entire group management request has been serviced, the child node will be deleted.

Figure 14:
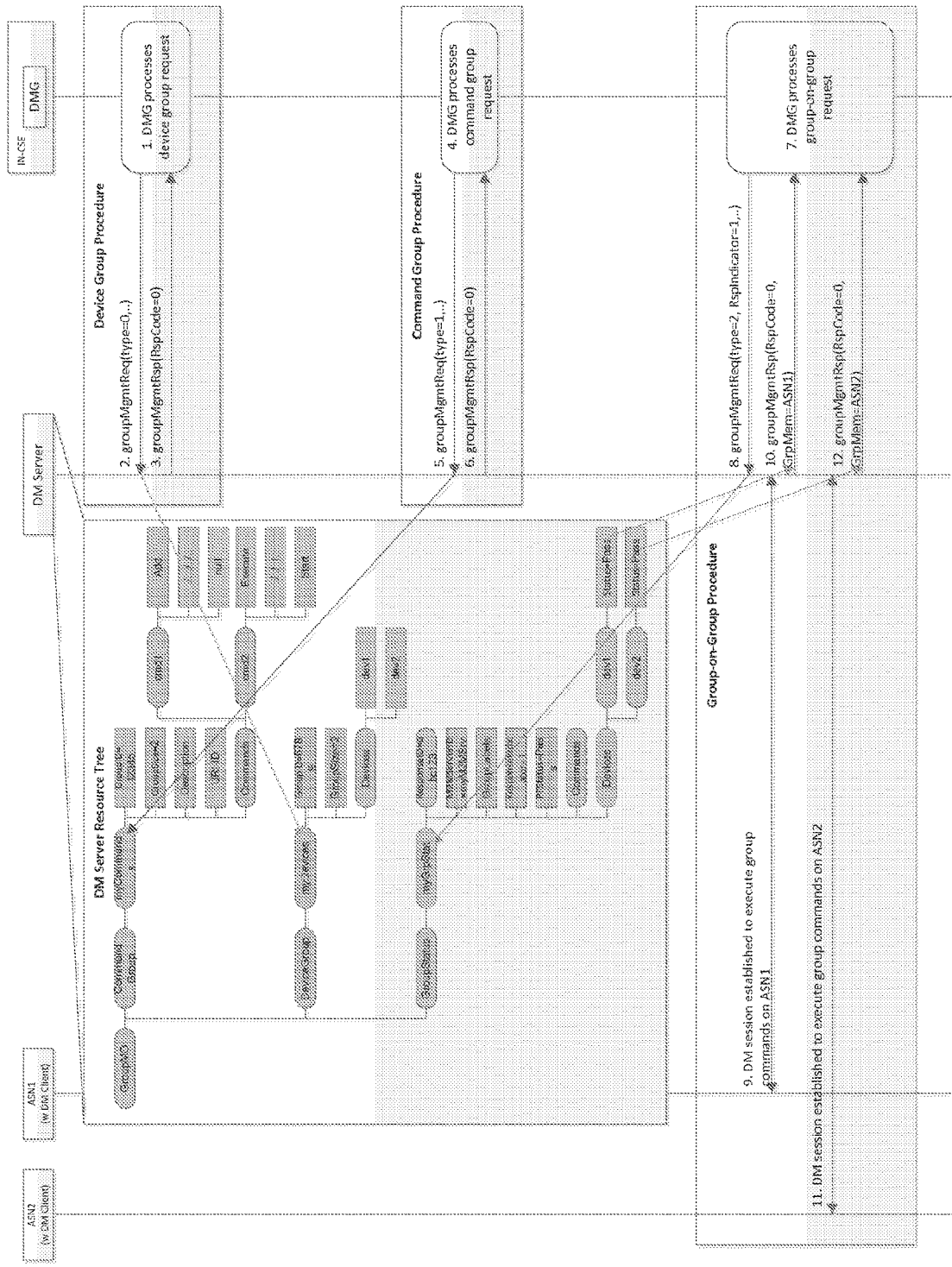
FIG. 14 illustrates group management operations on DM Server resources according to an embodiment of the application.

FIG. 14, for example, illustrates a group of management operations from FIG. 12. The steps are provided below. In Step 1 (not shown), the IN-CSE processes device group request from IN-AE. Next, the DMG within IN-CSE sends groupMgmtReq with type=0 indicating a device group request was made (Step 2). This request creates the myDevices node and all its child nodes as shown by the line between "2." and "myDevices" illustrated in FIG. 14. An example request is shown below in Table 7:

TABLE 7 groupMgmtReq(myM2MSrv, 29485, null,
Create, 0, 0, myDevices, 1, Payload)

| | |
|---|---|
| ServerID | myM2MSrv |
| SessionID | 29485 |
| TokenID | Null |
| Operation | Create |
| Type | 0 (device group) |
| cmdBlocking | 0 |
| GrpLabels | myDevices |
| RspIndicator | 1 |
| Payload | {dev1, dev2} |

In Step 3, the DM Server provides success response code to IN-CSE. Next, IN-CSE processes a command group request from IN-AE (not shown) in Step 4. Thereafter, the DMG within IN-CSE sends groupMgmtReq with type=1 indicating a command group request was made (Step 5). This request creates the myCommands node and all its child nodes as shown by the line between "5." and "myCommands illustrated in FIG. 14. An example request is shown below in Table 8:

TABLE 8 groupMgmtReq(myM2MSrv, 29485, null,
Create, 1, 0, myCommands, 1, Payload)

| | |
|---|---|
| ServerID | myM2MSrv |
| SessionID | 29485 |
| TokenID | Null |
| Operation | Create |
| Type | 1 (command group) |
| cmdBlocking | 0 |
| GrpLabels | myCommands |
| RspIndicator | 1 |
| Payload | { (cmd = add; para1 = ./../../..; para2 = null),<br>(cmd = execute; para1 = ./../../..; para2 = start) } |

Next, the DM Server provides a success response code to IN-CSE (Step 6). The IN-CSE processes group-on-group request from IN-AE (not shown) in Step 7. Subsequently, the DMG within IN-CSE sends groupMgmtReq with type=2 and RspIndicator=1 indicating a group-on-group request was made and that individual responses are requested whenever they are available (Step 8). This request specifies two labels in the GrpLabels parameter: myCommands and myDevices. The DM Server will then create the myGrpStat node and all its child nodes as shown by the line between "8." and "myGrpStat" illustrated in FIG. 14. The myGrpStat node contains 2 child nodes under ./GroupMO/GroupStatus/myGrpStatus/Devices to keep track of the execution status for each device. An example request is shown below in Table 9:

TABLE 9 groupMgmtReq(myM2MSrv, 29485, null, Create, 2, 0, "myCommands, myDevices", 1, Payload)

| | |
|---|---|
| ServerID | myM2MSrv |
| SessionID | 29485 |
| TokenID | Null |
| Operation | Create |
| Type | 2 (group-on-group) |
| cmdBlocking | 0 |
| GrpLabels | myCommands, myDevices |
| RspIndicator | 1 |
| Payload | null |

Further, a DM session is established between ASN1 and the DM Server in which commands cmd1 and cmd2 are exchanged (Step 9). When the DM session completes and if the execution was successful, the ./GroupMO/GroupStatus/myGrpStatus/Devices/dev1/status node is set to "Pass" by the DM Server.

Afterward, the DM Server sends the groupMgmtRsp( ) message to IN-CSE to indicate ASN1 completed successfully as shown by the line from "10." as illustrated in FIG. 14.

Meanwhile, another DM session is established between ASN2 and the DM Server (Step 11). Once again, management commands are exchanged. When the DM session completes and if execution was successful, the ./GroupMO/GroupStatus/myGrpStatus/Devices/dev2/status node is set to "Pass" by the DM Server.

The DM Server then sends the groupMgmtRsp( ) message to IN-CSE to indicate ASN2 completed successfully as shown by the line from "12." as illustrated in FIG. 14 (Step 12).

OMA LWM2M Group Management Support

According to even a further embodiment, group management support can be found in Table 10 and Table 11 for LWM2M protocol. The design of these tables follows in the spirit of LWM2M Objects, which are designed to be flat in nature and limit hierarchy. As a result, the device group and command group are combined into the Group Object with Object ID=10 and the GroupStatus Object contains the status of the group-on-group operations with Object ID=11. These two objects will only be available for the LWM2M Server and is used to support the group communications over the M2M Interface.

TABLE 10

| Name | Object ID | Instances | Mandatory | Object URN |
|---|---|---|---|---|
| LWM2M Group | 10 | Multiple | Optional | TBD |

| ID | Name | Instances | Mandatory | Type | Description |
|---|---|---|---|---|---|
| 0 | GroupID | Single | Mandatory | Integer | Group ID given to group |
| 1 | GroupType | Single | Mandatory | Integer | Determines the type of group: 0 = Devices 1 = Commands |
| 2 | ID | Multiple | Mandatory | Integer | When GroupType = 0, provides the deviceID When GroupType = 1, provides the URI-ID |
| 3 | DeviceType | Multiple | Optional | String | When GroupType = 0, provides the deviceType associated with the deviceID. Each resource instance pair will correspond to one device |
| 4 | Command | Multiple | Optional | String | When GroupType = 1, provides the LWM2M operation to be performed |
| 5 | TargetURI | Multiple | Optional | String | When GroupType = 1, provides the targetURI for the command specified above |
| 6 | Value | Multiple | Optional | String | When GroupType = 1, provides the Value (if required) for the command-targetURI pair above. The resource instances of command-targetURI-Value triplet correspond to one command. |

TABLE 11

| Name | Object ID | Instances | Mandatory | Object URN |
|---|---|---|---|---|
| LWM2M GroupStatus | 11 | Multiple | Optional | TBD |

| ID | Name | Instances | Mandatory | Type | Description |
|---|---|---|---|---|---|
| 0 | DevGroupID | Single | Mandatory | Integer | Group ID given to GroupType = 0 |
| 1 | CmdGroupID | Single | Mandatory | Integer | Group ID given to GroupType = 1 |
| 2 | ResponseID | Single | Mandatory | Integer | Response ID given to group management operation |
| 3 | M2MServerID | Single | Mandatory | String | Specifies the M2M Server ID associate with the group management operation |

TABLE 11-continued

| | | | | | |
|---|---|---|---|---|---|
| 4 | ResponseInd | Single | Optional | Integer | The response indicator provided in group management request |
| 5 | AggegrateStatus | Single | Optional | Integer | Aggregate status of all responses |
| 6 | DevStatus | Multiple | Optional | Integer | Individual status of each device |
| 7 | CmdStatus | Multiple | Optional | Integer | Individual status of each command |

The creation and updates of the above resources occur in a similar fashion to that of the case for OMA DM as described herein.

BBF CWMP Group Management Support

Table 12 below shows an example embodiment of a BBF CWMP profile that could be used to support the enhanced group management procedures proposed in this disclosure. The profile is separated into three main sections one each for commandgroup, devicegroup, and groupstatus. This profile will be hosted on the ACS to provide the ability to manage groups of commands and devices. The groupstatus data model would then provide status of the individual commands and devices if necessary. The group-on-group operation will trigger the creation of .group.groupstatus.{i} entries and be maintained until the request has been completely serviced.

for storing computer-readable or executable instructions is disclosed. The medium may include one or more computer-executable instructions such as disclosed above in the plural call flows according to FIGS. 8, 10 and 12. The computer executable instructions may be executed by a processor, such as the processor disclosed above that is employed in devices including the IN-CSE, DM Server and ASN devices.

While the systems and methods have been described in terms of what are presently considered to be specific aspects, the application need not be limited to the disclosed aspects. It is intended to cover various modifications and similar arrangements included within the spirit and scope of the claims, the scope of which should be accorded the broadest interpretation so as to encompass all such modifications and

TABLE 12

| Name | Type | Write | Description |
|---|---|---|---|
| .groups. | Object | — | This object defines the groups resource that describes what group operations are available |
| .groups.commandgroup.{i}. | Object | W | This object defines the Command group |
| CommandGroupNumberOfEntries | unsignedInt | — | Number of entries in CommandGroup |
| GroupID | string(64) | W | ID given to the group |
| GroupSize | unsignedInt | — | Number of members in the group |
| Description | string(256) | W | Brief description of the group |
| .groups.commandgroup.{i}.commands.{i} | Object | W | This object lists all the commands included for the specified group |
| CommandsNumberOfEntries | unsignedInt | — | Number of entries in Commands |
| Command | string(128) | W | RPC command |
| ParameterList | string(1024) | W | Parameters associated with RPC command in comma delimited list |
| .groups.devicegroup.{i}. | Object | W | This object defines the Device group |
| DeviceGroupNumberOfEntries | unsignedInt | — | Number of entries in DeviceGroup |
| GroupID | string(64) | W | ID given to the group |
| GroupSize | unsignedInt | — | Number of members in the group |
| .groups.devicegroup.{i}.devices.{i} | Object | W | This object lists all the devices included for the specified group |
| DevicesNumberOfEntries | unsignedInt | — | Number of entries in Devices |
| DeviceID | string(64) | W | Device ID of group member |
| DeviceType | string(64) | W | Device type of group member |
| .groups.groupstatus.{i}. | Object | — | This object defines the Status group in which status are saved for responses to M2M servers |
| GroupStatusNumberOfEntries | unsignedInt | — | Number of entries in GroupStatus |
| ResponseID | string(64) | — | Response ID for corresponding group status |
| M2MServerID | string(64) | — | ID of M2M Server that responses goes to |
| GroupLabel | string(64) | — | ID for group operations |
| ResponseIndicator | unsignedInt | W | Response indicator use for responses sent to M2M Server |
| PFStatus | unsignedInt | — | Pass/Fail status for aggregate total response |
| .groups.groupstatus.{i}.commands.{i} | Object | — | This object lists all the commands' status included for the specified group operation |
| CommandsNumberOfEntries | unsignedInt | — | Number of entries in Commands |
| Status | string(256) | — | Status received for specified command |
| .groups.groupstatus.{i}.devices.{i} | Object | — | This object lists all the devices' status included for the specified group operation |
| DevicesNumberOfEntries | unsignedInt | — | Number of entries in Devices |
| Status | string(256) | — | Status received for specified device |

The creation and updates of the above resources occur in a similar fashion to that of the case for OMA DM as described above.

According to yet another aspect of the application, non-transitory computer-readable or executable storage medium similar structures. The present disclosure includes any and all aspects of the following claims.

What is claimed is:

1. A computer-implemented apparatus comprising a non-volatile memory and a processor, the non-volatile memory storing computer-executable instructions that, when executed by the processor, causes the apparatus to perform the instructions of:

receiving a first request to create a device group including a set of devices in the group;

creating the device group;

receiving a second request to create a command group including a set of commands to perform on the devices, the second request including an identifier of the device group in an attribute of each of the commands;

creating the command group;

receiving a third request targeting the command group to execute the set of commands on each of the devices, the third request including a timer value indicating a duration for aggregating responses from the devices;

processing the third request;

sending a group management request API to a management server to execute the set of commands on each of the devices; and aggregating, before the timer expires, the responses from the devices into a single response.

2. The apparatus of claim 1, wherein the processor executes the instructions of receiving a response from the management server indicating execution of the commands by one of the devices.

3. The apparatus of claim 1, wherein the processor executes the instructions of sending a group management request API to the management server to create the device group, and wherein the set of commands of the command group is defined in a uniform resource locator.

4. The apparatus of claim 1, further comprising:

receiving a reply from the management server that the device and command groups have been created; and sending a reply to a device owner that the device and command groups have been created.

5. The apparatus of claim 1, wherein the command group includes a group resource selected from memberType, membersList, commandsList, commandBlocking, argumentsList, responseAggregation, responsePeriod and combinations thereof.

6. The apparatus of claim 5, wherein the group resource is the memberType, and wherein the memberType is <mgmtObj> or <mgmtCmd>.

7. The apparatus of claim 6, wherein the memberType is the <mgmtCmd>, and wherein the <mgmtCmd> includes an attribute selected from an execTarget, execInstance and combinations thereof.

8. The apparatus of claim 1, wherein the apparatus is a server.

9. A computer-implemented apparatus for establishing group-on-group operations in a M2M interface comprising a non-volatile memory and a processor, the non-volatile memory storing computer-executable instructions that, when executed by the processor, causes the apparatus to perform steps of:

receiving a registration request to manage a group of devices;

receiving a request to create a device group and a command group; and executing the received request to create the device group and the command group for the group of devices, wherein the command group includes a set of commands executed on each of the devices, wherein the command group includes a timer value indicating a duration for aggregating responses from the devices, and wherein the responses are aggregated into a single response before the timer expires.

10. The apparatus of claim 9, wherein the processor is further configured to receive a registration notification from the group of devices.

11. A computer-implemented method for establishing group-on-group operations in a M2M interface comprising:

receiving a registration request to manage a group of devices;

receiving a registration notification from the group of devices;

receiving a request to create a device group and a command group; and executing the received request to create the device group and the command group for the group of devices, wherein the command group includes a set of commands executed on each of the devices, wherein the command group includes a timer value indicating a duration for aggregating responses from the devices, and wherein the responses are aggregated into a single response before the timer expires.

12. The method of claim 11, further comprising:

sending a group management request API to a management server to create the device group; and sending a group management request API to the management server to create the command group.

13. The method of claim 12, further comprising:

receiving a reply from the management server that the device and command groups have been created; and sending a reply to a device owner that the device and command groups have been created.

14. The method of claim 11, wherein the command group includes a group resource selected from memberType, membersList, commandsList, commandBlocking, argumentsList, responseAggregation, responsePeriod and combinations thereof.

15. A computer-implemented method comprising:

receiving a first request to create a device group including a set of devices in the group;

creating the device group;

receiving a second request to create a command group including a set of commands to perform on the devices, the second request including an identifier of the device group in an attribute of each of the commands;

creating the command group;

receiving a third request targeting the command group to execute the set of commands on each of the devices, the third request including a timer value indicating a duration for aggregating responses from the devices;

processing the request;

sending a group management request API to a management server to execute the set of commands on each of the devices;

receiving a response from the management server indicating execution status of the set of commands; and aggregating, before the timer expires, the responses from the devices into a single response.

16. The method of claim 15, wherein the processing step includes substituting values for argument references located in an argumentList of the group resource.

17. The method of claim 15, wherein the set of commands of the command group is defined in a uniform resource locator and includes an absolute uniform resource identifier configured to fan out the request.

18. The method of claim 15, further comprising:

sending a group management request API to a management server to create the device group.

* * * * *